United States Patent
Aguado-Sierra et al.

(10) Patent No.: US 12,499,969 B2
(45) Date of Patent: Dec. 16, 2025

(54) COMPUTATIONAL MODELS FOR 3D MUSCULAR ELECTROPHYSIOLOGY AND ELECTROMECHANICS SIMULATION

(71) Applicant: ELEM BIOTECH S.L., Barcelona (ES)

(72) Inventors: Jazmin Aguado-Sierra, Barcelona (ES); Kostantyn Butakov, Barcelona (ES); Mariano Vazquez, Barcelona (ES)

(73) Assignee: ELEM BIOTECH S.L., Barcelona (ES)

( * ) Notice: Subject to any disclaimer, the term of this patent is extended or adjusted under 35 U.S.C. 154(b) by 236 days.

(21) Appl. No.: 18/319,687

(22) Filed: May 18, 2023

(65) Prior Publication Data

US 2023/0290431 A1    Sep. 14, 2023

Related U.S. Application Data

(63) Continuation of application No. PCT/EP2021/082222, filed on Nov. 18, 2021.

(30) Foreign Application Priority Data

Nov. 18, 2020    (EP) .................................... 20382997

(51) Int. Cl.
*G16B 5/00*    (2019.01)
*G16H 50/50*    (2018.01)

(52) U.S. Cl.
CPC ............... *G16B 5/00* (2019.02); *G16H 50/50* (2018.01)

(58) Field of Classification Search
CPC .......... G16B 5/00; G16H 50/50; G16H 20/10; G16H 70/40; A61B 5/308; A61B 5/316;
(Continued)

(56) References Cited

U.S. PATENT DOCUMENTS 10,296,707 B2 *  5/2019  Passerini ................ G16H 50/50
10,363,100 B2 *  7/2019  Trayanova ............. G16H 30/20
(Continued)

OTHER PUBLICATIONS

"International Search Report and Written Opinion" mailed on Apr. 4, 2022, for International Application No. PCT/EP2021/082222; 15 pages.
(Continued)

*Primary Examiner* — Vijay Shankar
(74) *Attorney, Agent, or Firm* — Perkins Coie LLP; Viola Kung; Gregory Logan

(57) ABSTRACT

A computer-generated, three-dimensional a heart model established with an electromechanical aspect and an electrophysiological aspect. The model may include tissue types and associated cell models comprising a system of ordinary differential equations describing properties for that tissue type, at least describing cell kinetics for ion channels of that tissue type. A three-dimensional model of a heart is constructed by creating a volume mesh comprising tissue type regions corresponding to each of the plurality of tissue types, wherein each tissue type region defines a local muscular fibre orientation in each tissue type region to correspond to a local alignment of muscular cells. The method further comprises running coupled three-dimensional electromechanical and electrophysiological simulations across the volume mesh. One or more derived physiological parameters are determined for the virtual patient.

19 Claims, 11 Drawing Sheets

(58) Field of Classification Search
CPC ......... A61B 5/318; A61B 5/319; A61B 5/322; A61B 5/4848
See application file for complete search history.

(56) References Cited

U.S. PATENT DOCUMENTS

| | | |
|---|---|---|
| 10,765,336 B2 * | 9/2020 | Trayanova .............. A61B 5/283 |
| 12,076,150 B2 * | 9/2024 | Trayanova .............. A61B 34/10 |
| 2014/0088943 A1 | 3/2014 | Trayanova et al. |
| 2015/0294082 A1 | 10/2015 | Passerini et al. |
| 2018/0078312 A1 | 3/2018 | Trayanova et al. |

OTHER PUBLICATIONS

Ghazanfari et al: "Arrhythmia Vulnerability in Diabetic Cardiac Tissue is Species-Dependent: Effects of IKATP, Uncoupling, and Connexin Lateralization", Cardiovascular Engineering and Technology, vol. 8, No. 4, Jun. 22, 2017, pp. 527-538.

Pravdin at al: "Human Heart Simulation Software for Parallel Computing Systems", Procedia Computer Science, vol. 66, Dec. 31, 2015, pp. 402-411.

Vigmond et al: "Computational tools for modeling electrical activity in cardiac tissue", Journal of Electrocardiology., vol. 36, Dec. 1, 2003; pp. 69-74.

* cited by examiner

COMPUTATIONAL MODELS FOR 3D MUSCULAR ELECTROPHYSIOLOGY AND ELECTROMECHANICS SIMULATION

This application is a continuation of PCT/EP2021/082222, filed Nov. 18, 2021; which claims the priority of EP20382997.3, filed Nov. 18, 2020. The contents of the above-identified applications are incorporated herein by reference in their entireties.

TECHNICAL FIELD

The present invention is concerned with models for the simulation of muscle function, in particular cardiac function.

BACKGROUND

The behaviour of muscular tissue is of critical importance in the function of the healthy human and animal body, both in the musculoskeletal system which allows bodily movement, and in muscles associated with internal organs, such as the cardiac muscle of the heart, and the smooth muscle of other organs such as the uterus, bladder and digestive system. In particular in the case of internal organs, the activity of muscle tissue underpins the function of the organs themselves. Equally, appreciation of the problems and pathologies which can occur in muscle tissue or the organs they are associated with has vast medical application. Although experimental research is essential to improve diagnosis and treatment techniques, computational tools are gradually gaining importance. Biomechanical simulations provide a powerful tool to understand organ and muscle function both in healthy individuals and in those with congenital and acquired pathologies.

Modeling the dynamics of muscular tissue is a highly complex task. Muscle function involves a considerable range of spatial scales and different tightly coupled multiphysics problems. Several orders of magnitude are linked, from the microscopic cell arrangement into a volumetric arrangement, to the macroscopic shape of the muscle chambers. Also, different types of physical problems are involved. In muscle, electrical stimuli in the form of action potentials propagate through the myocytes triggering muscle contraction, which in turn exerts work upon associated structures, such as attached bones or the structure of muscular organs. This is also known as excitation-contraction (EC) coupling. EC coupling is the result of a series of complex reactions that can be summarized as follows. $Ca^{2+}$ enters the cells during the plateau phase of the action potential caused by an increase of the permeability of the cell membrane (sarcolemma). This extracellular $Ca^{2+}$ triggers the release of a larger amount of intracellular $Ca^{2+}$ from the sarcoplasmic reticulum. $Ca^{2+}$ then binds to troponin C, which interacts in turn with tropomyosin, allowing the myosin to bind with the actin filaments. Myosin head pull the actin filament toward the center of the sarcomere, producing the contractile force. To simplify, it can be said that the free intracellular concentration of $Ca^{2+}$ mediates the contraction of the muscle tissue, explaining why many models are based on this quantity.

One of the most vital muscle functions in the human body is the heart. Cardiovascular diseases (CVD) are the leading cause of death worldwide in all regions except Africa, and these are predicted to increase with aging populations. The high prevalence of such diseases produces global health and economic burdens. Biomechanical simulations represent a particularly useful option for the understanding of heart function and its behaviour under various pathologies. In addition, as in other disciplines, such simulations can become a key tool in designing surgical procedures, techniques, or devices.

For example, patient specific models can be used to examine the possible impacts and likelihood of success of proposed reconstructive procedures in diseased hearts, without needing clinical experimentation, which carries obvious risks (Tang et al. "Image-Based Patient-Specific Ventricle Models with Fluid-Structure Interaction for Cardiac Function Assessment and Surgical Design Optimization", Prog. Pediatr. Cardiol. 2010 Dec. 1; 30 (1-2): 51-62.). This is of particular value in heterogeneous conditions such as myocardial infarctions which vary widely in the size of cardiac tissue affected and the severity of any damage, as well as in congenital and developmental defects which can affect the morphology of the heart in various ways even between patients with similar diagnoses.

However, modeling the beating heart and its pumping action has the complexities associated with the modeling of other muscular tissue, as described, along with more esoteric considerations. The macroscopic shape of the cardiac chambers is of high importance, as well as that of smaller scale structures such as false tendons and trabeculae. Cardiac muscle contraction exerts work upon the blood inside the cavities and changes the conformation of the heart itself. In addition, the heart is constantly beating, in a rhythmic and coordinated way, such that the tissue is constantly in a state between contracting and recovering from previous activity. Therefore, in cardiac muscle the linkage between structure, excitation, contraction, and work done is particularly tight.

From a physical standpoint, the heart pumping action can be decomposed in three coupled problems: the propagation of the action potential that induces the mechanical deformation of the solid and which in turn performs work against the fluid. These problems are coupled bidirectionally Therefore, from the computational mechanics standpoint, the heartbeat is a tightly coupled fluid-electro-mechanical problem.

The heart is composed of four cavities, also known as chambers: right atrium (RA), right ventricle (RV), left atrium (LA), and left ventricle (LV). In a healthy beating heart, a specialised conduction system controls synchronized depolarisation and contraction of the chambers. The electric impulse originates spontaneously (although under influence from the autonomic nervous system) in the sinoatrial (SA) node and propagates through a system of specialised cells adapted to conduct action potentials through the heart to the Purkinje fibres, leading to an almost synchronous depolarization of both ventricles. The arrangement of cardiomyocytes is also critical for its function. The cardiomyocytes are packed into fibres, which are distributed in a somewhat helicoidal manner. Cell heterogeneities can be found from endocardium to epicardium, and in apex-base direction.

These heterogeneities affects both the electrical depolarisation and the muscle action of the heart, meaning that the myocardium can be characterized as an anisotropic material (meaning that the properties of the material, for example in terms of impulse conduction and contraction differ depending on the direction considered), and more specifically as an orthotropic material (where these properties differ along orthogonal axes at a particular point).

The tissues surrounding the heart also affect the way it beats. The myocardium is in intimate relation with the pericardium, a thin fibrous membrane that surrounds the organ and modulates its deformation. Different imaging techniques as speckle tracking echocardiography and diffusion tensor MRI have provided a deeper understanding of cardiac mechanics. The above described histological and mechanical conditions induce a displacement of the base of the heart, in base-apex direction, and a slight torsion of the ventricles due to the action of the fibres. Due to the pericardium, the epicardium has a reduced normal displacement, being relatively free to move in the tangential plane.

Well-defined mathematical and numerical models of cellular electrophysiology and action potential propagation are of great importance for researching and understanding different electrophysiological phenomena, in muscle tissue generally as well as cardiac tissue. From the early 60s, generic models of single-cell (microscopic level) have been created for a wide range of species and cardiac cell types. These models have achieved a high degree of detail in the description of cellular ionic currents and dynamics of several intracellular structures. They have been used to advance the understanding of processes influencing specific pathophysiological responses, and they have also been successful in describing cell properties. Despite all these advantages, it is impracticable to derive a whole heart (macroscopic level) by modeling every single cell that it contains. The most obvious reason of this impossibility is the huge computing requirements, which make the problem computationally intractable. Since the mid-forties, several methods have been developed in order to simulate the electrical propagation in the excitable media (macroscopic or multicellular level) such as the cardiac tissue: reaction-diffusion systems, cellular automata and hybrid models. Initially, they were used to reproduce excitation propagation in two-dimensional sheets of cardiac muscle. In the last years, several works have shown that these computational models can also be applied to describe three-dimensional phenomena. These models do not take into account microscopic cellular behavior and, typically, the set of parameters that determines their action have scarce (or null) physiological meaning.

It is therefore an aim of the present invention to provide methods for producing models of the human heart and wider vascular system which represent real world conditions and populations, but which can be used to provide an effective basis for the making of clinical interventions.

SUMMARY OF THE INVENTION

Given the major events involved with each beat of the model heart function, being the electrophysiological propagation of an action potential through the myocytes, and the mechanical deformation governing their subsequent contraction, leading to the movement of the fluid itself, separate but interlinking methods have been developed in order to model each of these aspects. Modelling will typically be carried out using the Finite Element Method (FEM) using the Finite Differences Method (FDM) to provide discretization in time—modelling would use a volumetric mesh using tetrahedra or other appropriate polyhedral. Electrophysiology, solid dynamics and fluid dynamics are separate interacting aspects that all need to be modelled. The electrophysiological model describes in particular the propagation of action potential across and between myocytes. The solid mechanics problem is directed to the stresses in the cardiac tissues, and in particular the fibers—electromechanical considerations also need to be addressed. Computational fluid dynamics is used to model the behaviour of the blood in cavities and vessels, and special consideration needs to be given to the wet surface between blood and tissue in addressing the effect of fluid-structure interaction on the mechanical problems.

In addressing these interacting aspects, any successful simulation requires the complex modelling of a large number of interrelated parts of the cardiac tissue. Capturing fine details of the geometry requires a very fine mesh of segments to be generated, exponentially increasing the scale of the complex modelling problems which need to be solved. As a result, currently it is necessary for parallel computing approaches to be used, for example using supercomputer resources, in order for models to be generated and assessed in a useful time period. This also requires the parallelisation of the problems to be solved.

Heart morphology and function can therefore differ significantly at a population level. While the simulation of a heart belonging to a specific (real or hypothetical) individual can be of considerable value, it is also considered that for in silico trial methods, models and investigations to be applicable to the general human population, there is a particular benefit in generating a virtual population which span the range of characteristics to be found in this population.

Accordingly, in a first aspect there is provided a computer-implemented method of simulating a heart for a virtual patient, the method comprising: establishing a heart model with an electromechanical aspect and an electrophysiological aspect, where the heart model comprises a three dimensional model of a heart comprising a plurality of functional elements, by: defining a plurality of tissue types to be included within the heart model; for each tissue type, defining an associated cell model for a functional element to be associated with that tissue type, wherein each cell model comprises: a system of ordinary differential equations describing electrophysiological and electromechanical properties for that tissue type, the system at least describing cell kinetics for ion channels of that tissue type; determining a plurality of input physiological parameters for the virtual patient, wherein each of the physiological parameters lies within an observed range in a human population; constructing a three-dimensional model of a heart for the virtual patient, by: creating a volume mesh comprising tissue type regions corresponding to each of the plurality of tissue types, wherein each tissue type region is populated by a plurality of functional elements with their associated cell model; defining a local muscular fibre orientation in each tissue type region to correspond to a local alignment of muscular cells; and running coupled three-dimensional electromechanical and electrophysiological simulations across the volume mesh, and determining one or more derived physiological parameters for the virtual patient, and for a subset of the derived physiological parameters determining that said derived physiological parameters lie within an observed range in a human population.

In embodiments, the input physiological parameters may comprise electrophysiological parameters relating to one or more of ion channel dynamics, gate kinetics, transmembrane voltage, and a calcium transient, and/or may comprise electromechanical parameters selected from one or more of stiffness, stress, strain, elasticity, and contractility.

In embodiments, a plurality of input physiological parameters may be determined for at least one further virtual patient in order to create a virtual population of multiple virtual patients, wherein at least one of the input physiological parameters differs for each virtual patient within the population.

Where the intention is to generate a virtual population, the heart model may be selected based on its representation of a particular segment of a population, for example, where the heart model represents an extreme of at least one parameter such as size, age, sex, or disease status, as discussed further below.

These different input physiological parameters may comprise one or more of ion channel conductances or gate kinetics, pressure ranges, tissue properties, stiffness, conduction velocity, or variability on the crossbridge kinetics. At least one of the input physiological parameters may represent an extreme of variation of the observed range in a human population. Extremes of variation of the observed range in a human population for other parameters may be used to determine whether or not a virtual patient legitimately belongs in a virtual population.

The different input physiological parameters may comprise the effect of a medical intervention, optionally wherein the effect of a medical intervention is selected from drug kinetic activity, and the effect of a medical device such as a pacemaker or a pump. Such different input physiological parameters may comprise information relating to a pathological state, and/or known variability of input parameters.

In embodiments, for each cell model, multiple activation events may be simulated until a steady state is reached or accepted.

In particular embodiments, the method may further comprise determining one or more heterogeneous regions in the three-dimensional model of a heart, wherein the one or more heterogeneous regions have electrophysiological and/or electromechanical properties varied from normal properties for their tissue type. Such regions may comprise a tagged region corresponding to tissue affected by one or more of fibrosis, infarction, hypertrophy and ischemia.

In embodiments, the volume mesh may comprise cavities lacking tissue regions and comprising fluid. In some cases, functional elements within the three-dimensional model of a heart may be coupled with a conductivity parameter. Moreover, at least one portion of the volume mesh may be defined as an activation region where electrophysiological activation is initiated.

In embodiments, running coupled three-dimensional electromechanical and electrophysiological simulations across the volume mesh may comprise using an instance of simulation code for each of the electromechanical and electrophysiological simulations coupled through one or more message passing interfaces.

In embodiments, the one or more derived physiological parameters may comprise one or more of QRS and QT intervals, ejection fraction, systolic and diastolic volumes, flow rates across the cardiac valves, myocardial strains, pressure, and longitudinal strains.

Where the intention is to generate a virtual population, input physiological parameters for each virtual patient may comprise electrophysiological parameters of the cell models comprising models of transmembrane ion channels, and defining the models of transmembrane ion channels may comprise establishing a variety of parameter values that determine a spectrum of phenotypes in the human population for each of the ion channels, such that a test virtual population for simulation is generated from combinations of values from said spectrum of phenotypes. This approach may be used to establish cardiotoxicity of one or more drugs by determining the effects of said drugs on the ion channels across the test virtual population. The effect of the one or more drugs may be established by employing information from in vitro studies.

In embodiments, the simulations may be used to model the effects of one or more treatments on the heart.

In a further aspect, there is provided a method of simulating a heart, the method comprising establishing a heart model with an electromechanical aspect and an electrophysiological aspect, where the heart model comprises a three-dimensional model of a heart comprising a plurality of functional elements. Establishing the heart model comprises defining a plurality of tissue types to be included within the heart model, and for each tissue type, defining an associated cell model for a functional element to be associated with that tissue type. Each cell model comprises a system of ordinary differential equations describing electrophysiological and electromechanical properties for that tissue type, the system at least describing cell kinetics for ion channels of that tissue type. For each cell model, multiple activation events are simulated, until a steady state is reached or accepted. The method further comprises constructing a three-dimensional model of a heart, by creating a volume mesh comprising tissue type regions corresponding to each of the plurality of tissue types, wherein each tissue type region is populated by a plurality of functional elements with their associated cell model, determining one or more heterogeneous regions, wherein the one or more heterogeneous regions have electrophysiological and/or electromechanical properties varied from normal properties for their tissue type, and defining a local muscular fibre orientation in each tissue type region to correspond to a local alignment of muscular cells. The method further comprises running coupled three-dimensional electromechanical and electrophysiological simulations across the volume mesh.

In a medical context, where the function of abnormal, diseased, or otherwise perturbed cardiovascular systems is of interest, and the simulation of such hearts (or other organs) is of particular interest.

For example, a number of congenital and/or developmental heart disorders exist where structure of the heart is disrupted from birth, with a number of possible causes. Such defects can include septal defects which allow blood to flow directly between the left and right sides of the heart, obstructive defects resulting from the narrowing (stenosis) or blockage of heart valves, arteries or veins, overriding aorta allowing blood from both ventricles to enter the aorta, hypertrophy of one or more areas of the heart, and hypoplasia of one or other of the ventricles. A versatile and accurate modelling system should be able to accurately simulate hearts which are affected in such ways, and it should also enable the monitoring of predicted function and the assessment of success of various interventions.

As another example, myocardial scarring (the replacement of healthy cardiac tissue with fibrous tissue) is a common situation after myocardial infarction and/or surgical interventions on the heart. This scarring significantly changes the function of the heart, as fibrous scar tissue neither conducts electrical inputs in the same way as healthy cardiac tissue, nor does it contract as healthy tissue does. Further, scar tissue can cause the spontaneous depolarisation of neighbouring myocytes.

The size, location, composition, structure and mechanical properties of the scar tissue are crucial in the prospects of patients who survive the initial damage (Richardson et al, 2016, *Compr Physiol.*; 5 (4): 1877-1909). Similarly, the phenomenon of 'infarct expansion' (the stretching and/or thinning of heart tissue in the area of infarct) can significantly change the mechanical and other properties of the heart, potentially contributing to further ventricle remodelling and the development of heart failure, if the pumping capacity of the remodelled heart is no longer sufficient. Conversely, it is also common for scar tissue to be significantly stiffer that healthy tissue after infarction, thus requiring greater pressure to inflate the chamber where the tissue is located. Both effects can be found in various balances even within the same affected tissue.

Due to such competing effects, and the considerable compensatory reflexes which occur after heart damage such as that following myocardial infarction (for example, the constriction of systemic veins/venoconstriction which acts to increase pressure, the increase of systolic force generation by healthy myocardium via the Frank-Starling mechanism), it can be difficult to assess the reduction of function after cardiac damage by existing methods. Compensatory reflexes can often (except in the case of very large infarcts) restore cardiac output to near normal levels, although there are measurements which do usually change after infarction, such as an increase in end-systolic volume (Richardson et al., 2016).

With this in mind, a model suitable for a subject with cardiac scarring or other damage would need to take the above factors into account in a knowledge-based or subject-specific way in order to model the heart accurately. As indicated above, any such specific models would have to take into account the properties of scar tissue covering the electrophysiological (the transmission of action potentials) and the mechanical (contractility, stiffness, elasticity), as well as appreciating the effect that such tissue has on the overall geometry of the heart. This requires accurately assessing the size, location, transmural extent, and makeup of the scarred tissue, as well as its permeability or otherwise to action potential transmission, and modelling same within existing frameworks. Likewise, accurate models of structural heart defects would need to closely match the specific morphology of the heart in question and determine blood flow given the constraints imposed.

It is also important to take into account further knowledge-based or patient-specific information, independent of pathology. For instance, sex-specific differences exist between male and female hearts and cardiomyocytes, including ion channel expression and conduction velocity differences, with differences also present between the hearts of adults and children.

The cell model may comprise electrophysiological parameters relating to one or more of ion channel conductance, transmembrane voltage, and a calcium transient; and/or may comprise one or more electromechanical parameters, which may be selected from one or more of stiffness, stress, strain, elasticity, and contractility.

Constructing the three-dimensional model of a heart may further comprise setting boundary conditions comprising one or more of electrophysiology, solid mechanics, and fluid mechanics; and/or assigning the functional elements a fibre orientation. The functional elements within the three-dimensional model of a heart may be coupled with a conductivity parameter. One or more of the electrophysiological and electromechanical parameters may be orthotropic with respect to the three-dimensional model.

The heart model may relate to the heart of an individual. The volume mesh may be based on an existing population model or a specific individual patient's; and/or may be selected based on individual-specific information. The individual-specific information may comprise one or more of: age, sex, disease status, and identified heart morphology.

The one or more heterogenous regions may comprise one or more tagged regions populated by functional elements with associated cell models which are assigned different electrophysiological and/or electromechanical parameters compared to regions which are not tagged. The tagged region may be identified based on individual-specific information, and may be identified based on a scan of the heart of an individual. The tagged region may correspond to tissue affected by one or more of fibrosis, infarction, hypertrophy and ischemia. The tagged region may lack one or more electrophysiological parameters, preferably lacking or with an extremely low conductivity. The tagged region may lack one or more electromechanical parameters, preferably lacking contractility. The tagged region may be assigned a different stiffness compared to a region which is not tagged. The tagged region may not be populated by functional elements.

The plurality of defined tissue types may comprise endocardial, midmyocardial and epicardial tissue types. One of the tissue types may have relatively increased conductivity.

At least one portion of the volume mesh may be defined as an activation region where electrophysiological activation is initiated.

One or more of the electrophysiological or electromechanical parameters of the cell models may be selected based on individual-specific information. The individual-specific information may comprise one or more of: age, sex, disease status, and identified heart electrophysiology.

Running coupled three-dimensional electromechanical and electrophysiological simulations across the volume mesh may comprise using an instance of simulation code for each of the electromechanical and electrophysiological simulations coupled through one or more message passing interfaces. Electromechanical and electrophysiological simulations may be carried out stepwise, with electromechanical and electrophysiological simulation steps in one simulation step being performed on the results of the previous simulation step. In each simulation step, following the electromechanical step, the method may comprise performing a solid mechanics simulation step and performing a fluid mechanics simulation step responsive to the results of the solid mechanics simulation step.

Any of the above methods may further comprise the computation of one or more biomarkers to determine mechanical activity of the heart. The one or more biomarkers may comprise one or more of a pseudo-electrocardiogram (ECG); the volumetric integral of the calcium transient; the volumetric integral of the calcium transient; ECG morphology and QRS duration; Atrio-ventricular (AV) and inter-ventricular (VV) delays; Velocity-time integral of the LV outflow tract (LVOT) to estimate cardiac output; LV end-systolic volume (LVESV); LV Ejection fraction (LVEF); GLS (Global Longitudinal Strain); ESVI (End-Systolic Volume Index); Systolic dyssynchrony index (SDI); LV systolic dyssynchrony from 3D echocardiography regional LV time-volume curves; and haemodynamic forces.

In a further aspect, there is provided a method of simulating a heart according to any of the possibilities described above, and further comprising establishing one or more tagged regions to represent an infarct scar model; defining at least one portion of the volume mesh as a pacing location, and establishing a 3D stationary state for simulations by running coupled three-dimensional electromechanical and/or electrophysiological simulations across the volume mesh until a steady state is reached. Once a steady state is reached, the state variable values for the cell models of the functional elements comprised within the three-dimensional model are saved. The method includes carrying out a tachycardia induction protocol comprising returning the three-dimensional model to the state variable values as saved, initiating a first stimulus (S1) in the at least one pacing location, adding a second stimulus (S2) in the same or different pacing location after a delay, repeating the stimuli (S1, S2 . . . ) with progressively reduced delay until a refractory stimulus is achieved, and initiating activation with a train of stimuli (S1, S2 . . . ), with a delay equal to the shortest delay which did not achieve a refractory stimulus. The preceding activation steps are then repeated, further comprising adding an additional stimulus (S3, S4 . . . ) in the same pacing location with a further delay. The method further comprises determining whether tachycardia is observed.

Tachycardia may be determined by observing a change in a pseudo-electrocardiogram. The tachycardia induction protocol may be repeated using different pacing locations or combinations thereof.

The regions representing the infarct scar model may be populated by functional elements with variations of one or more electrophysiological or electromechanical parameters. The regions representing the infarct scar model may not be populated by functional elements.

In a still further aspect, there is provided a method according to any variation of the methods described above, wherein the electrophysiological parameters of the cell models comprise models of transmembrane ion channels. The method further comprises defining the models of transmembrane ion channels comprises establishing a variety of parameter values that determine a spectrum of phenotypes in the human population for each of the ion channels, and constructing a test virtual population for simulation from combinations of values from said spectrum of phenotypes.

The spectrum of phenotypes may be assessed by quantifying electrophysiological biomarkers. The spectrum of phenotypes may include phenotypes on the extremes of normality or disease.

The described methods may further comprise establishing cardiotoxicity of one or more drugs by determining the effects of said drugs on the ion channels across the test virtual population, or in single models. The effect of the one or more drugs is established by employing information from in vitro studies.

In a further aspect, there is provided a method according to any variation of the methods described above, wherein the simulations are used to model the effects of one or more treatments on the heart. One or more of these treatments may be selected from pacemaker installation, drug treatment, and ablation therapy. Such methods may be used to predict the effect of such treatments, and may be carried out before, during and/or after such treatments take place.

In a yet further aspect, there is provided a method of simulating a muscle, the method comprising establishing a muscle model with an electromechanical aspect and an electrophysiological aspect, the muscle model comprising a plurality of functional elements. The method further comprises defining a plurality of tissue types to be included within the muscle model. For each tissue type, an associated cell model is defined for a functional element to be associated with that tissue type, wherein each cell model comprises a system of ordinary differential equations describing electrophysiological and electromechanical properties for that tissue type, the system at least describing cell kinetics for ion channels of that tissue type. For each cell model, multiple activation events are simulated until a steady state is reached or accepted. A three-dimensional model of a muscle is constructed, by creating a volume mesh comprising tissue regions corresponding to each of the plurality of tissue types, wherein each tissue type region is populated by a plurality of functional elements with their associated cell model. One or more heterogeneous regions is determined, wherein the one or more heterogeneous regions have electrophysiological and/or electromechanical properties varied from normal properties for their tissue type. A local muscular fibre orientation in each tissue type region is defined to correspond to a local alignment of muscular cells. The method further comprises running coupled three-dimensional electromechanical and electrophysiological simulations across the volume mesh.

DETAILED DESCRIPTION

Figure 1:
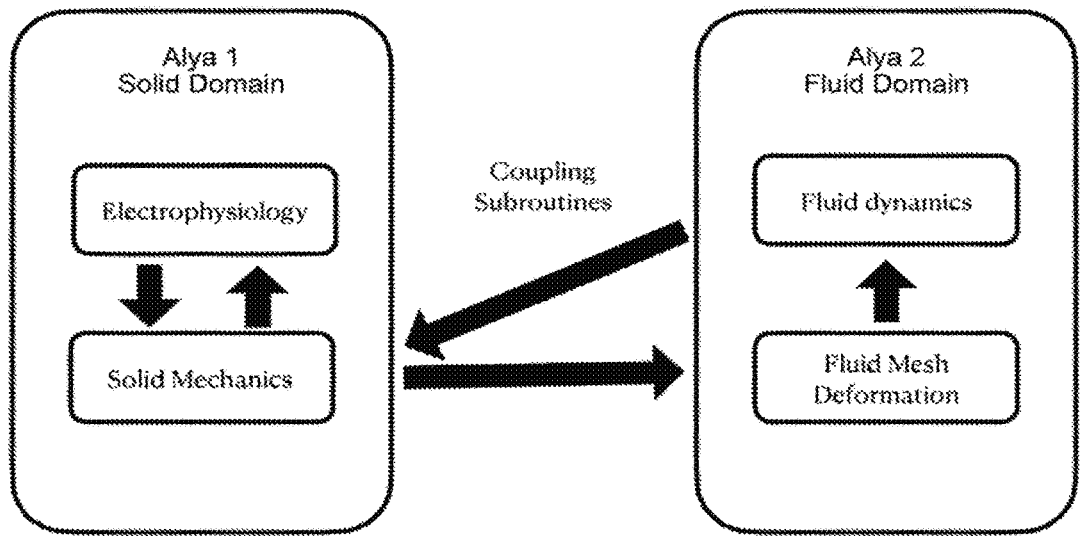
FIG. 1 shows that the heart pumping action can be decomposed into coupled problems: the propagation of the action potential that induces the mechanical deformation of the solid, the two together defining a solid domain model, the mechanical deformation of the solid performing work against the fluid represented by a fluid domain model.

Prior to setting forth the invention, a number of definitions are provided that will assist in the understanding of the invention. All references cited herein are incorporated by reference in their entirety. Unless otherwise defined, all technical and scientific terms used herein have the same meaning as commonly understood by one of ordinary skill in the art to which this invention belongs.

The terms "myocytes", "muscle cells" and similar terms are used interchangeably herein and refer to contractile cells or fibres present in muscular tissue. Skeletal muscles may be formed of muscle fibres, which are multinucleate syncytia formed by the fusion of myoblasts. These cells or fibres contract in response to an action potential, thus producing the force acting on associated structures, and can transmit the action potential signal along the cell or fibre, and to neighbouring cells in certain types of muscular tissue.

The terms "cardiomyocytes", "cardiac myocytes", "cardiac muscle cells", "heart muscle cells" and similar terms are used interchangeably herein and refer to the muscle cells which make up the heart muscle. These cells contract in response to an action potential, thus producing the force acting on the blood within the heart, and can transmit the action potential signal to neighbouring cells.

The term "action potential" or "electrical impulse" relates to the rapid, cyclic change in voltage undergone across the cell membrane of certain cells, such as neurons and muscle cells. This action potential is mediated by the opening and closing of ion channels in the membranes, and triggers the contraction of the cardiac cell. The action potential propagates across the cell and can be passed on to neighbouring cardiac cells through gap junctions. In particular, certain specialised cells in the heart (constituting the His-Purkinje network) conduct action potentials at a faster rate in order to coordinate the spread of activation across the heart. In the healthy heart, action potentials are spontaneously generated by the specialised cells of the sinoatrial node at intervals corresponding to the heartbeat.

The method of the invention involves progressive refinement of one or more standard heart models to conform with that of a selected patient.

The implementation of embodiments of the invention involves computer modelling of the heart. General aspects of the approach to modelling used will be described below, with details of model implementation and adaptation described later when specific embodiments are described in detail.

Modelling of a three-dimensional object is typically carried out using a mesh. This is a collection of vertices, edges and faces describing an object in three dimensions as a large number of polyhedra. For representation of an object such as the heart, this is a volumetric mesh representing all the functionally relevant volumes of the heart. Volumetric meshes are widely used for finite element analysis, in which large systems are subdivided into smaller simpler parts. The behaviour of individual parts is described by a system of relatively simple equations, with the behaviour of the whole system being described by a solution over the assemblage of component problems. This typically involves finding the best effective solution to a complex set of partial differential equations.

The heart is a complex and tightly coupled system of systems. Therefore, a multi-physics description (fluid-electro-mechanical or, at least, electro-mechanical depending on the case) is needed for a full description. While these systems can be modelled discretely, a solution will of course need to provide a consistent result for each physical system with appropriate coupling between them. An example of a fully coupled three physics systems in the art are described in Watanabe et al "Multiphysics simulation of left ventricular filling dynamics using fluid-structure interaction finite element method", Biophysical Journal, 2004; 87 (3): 2074-2085 with the use of this approach in simulation described in Hosoi et al "A multi-scale heart simulation on massively parallel computers" in International Conference for High Performance Computing; 2010; New Orleans, Louisiana. A review of existing models together with further details of the modelling and computational approach described here may be found in Santiago et al, "Fully coupled fluid-electro-mechanical model of the human heart for supercomputers", International Journal for Numerical Methods in Biomedical Engineering, 2108;34: e3140. The computational approach followed is described below, followed by a discussion of mathematical modelling for each area of physics.

From a physical standpoint, the heart pumping action can be decomposed in three coupled problems: the propagation of the action potential that induces the mechanical deformation of the solid, the two together defining a solid domain model, the mechanical deformation of the solid performing work against the fluid represented by a fluid domain model—this is shown in FIG. 1. The two coupling points are electromechanical and fluid-structure, both of them bidirectional couplings. In the approach described, the fluid mechanics part is solved using an arbitrary Lagrangian-Eulerian (ALE) scheme on a deforming mesh. The fluid mesh deformation is considered as a fourth problem, and this is solved with a Poisson equation with nonhomogeneous diffusion.

The four problems share some common features. The four problems are discretized in space using the finite element method (FEM) on non-structured meshes. Here, using tetrahedra. First derivative time dependency (needed for fluid mechanics, electrophysiology and mesh deformation) is discretized in time using the finite differences method (FDM) in one of these techniques: forward Euler, backward Euler or Crank-Nicholson, depending on the treated problem. Second derivative time dependency (solid mechanics) is also discretized using FDM, but in this case following an α-generalized Newmark scheme.

Once discretized, the continuum mechanics models are transformed in algebraic systems. While the mesh deformation problem discretization results in a linear algebraic system, fluid mechanics, solid mechanics and electrophysiology yield nonlinear systems. Nonlinear problems are linearized and solved with either Jacobi (fixed-point) or Newton iterations.

For modelling a heart, each of these four problems can be very large, requiring parallelization for effective computation. In embodiments, all the four cases may be handled by a hybrid scheme for parallelization, using MPI for tasks and OpenMP for threads. MPI (Message Passing Interface) supports parallelization by allowing tasks to run independently of each other in parallel—here an automatic mesh partition scheme may be implemented (using, for example, METIS). OpenMP (Open Multi-Processing) threads may be used for parallelization of loops—for example, the heavy-duty loops of MPI tasks. The system of equations used for each problem is now described in more detail, after which the computational approach is further described.

Models of the electrophysiology of heart tissue, with particular attention to the propagation of action potential across and between myocytes has been discussed at length in Vázquez et al "A massively parallel computational electrophysiology model of the heart", Int. J. Numer. Meth. Biomed. Engng. (2011), and Lafortune et al "Coupled electromechanical model of the heart: Parallel finite element formulation", Int. J. Numer. Meth. Biomed. Engng. 2012. The electrophysiology (EP) problem is decomposed in tissue and cell models. The tissue model is solved using a monodomain model governed by an anisotropic diffusion equation.

There are two main methods for ions to cross the cardiomyocyte membrane: Active Transport and Diffusion. The Nernst Equation is employed to define the transmembrane voltage due to ion motion:

$$V = \frac{RT}{zF}\ln\frac{[C_0]}{[C_i]} \qquad \text{Equation 1}$$

where V is the potential, $C_0$ is the concentration of an ion outside the cell, $C_i$ is the concentration of the same ion inside the cell, R is the gas constant, z is the valence of the ion, and F is the Faraday constant.

Ions in a resting cell exist in an electrochemical equilibrium, defined by the Goldman-Hodgkin-Katz equation:

$$V_m = \frac{RT}{zF}\ln\frac{\sum_{ion} P_{ion}[C_0]_{ion}}{\sum_{ion} P_{ion}[C_i]_{ion}} \qquad \text{Equation 2}$$

where $V_m$ is the transmembrane potential, $P_{ion}$ is the permeability of the membrane to a particular ion and $[C]_{ion}$ is the concentration of a particular ion.

Figure 2:
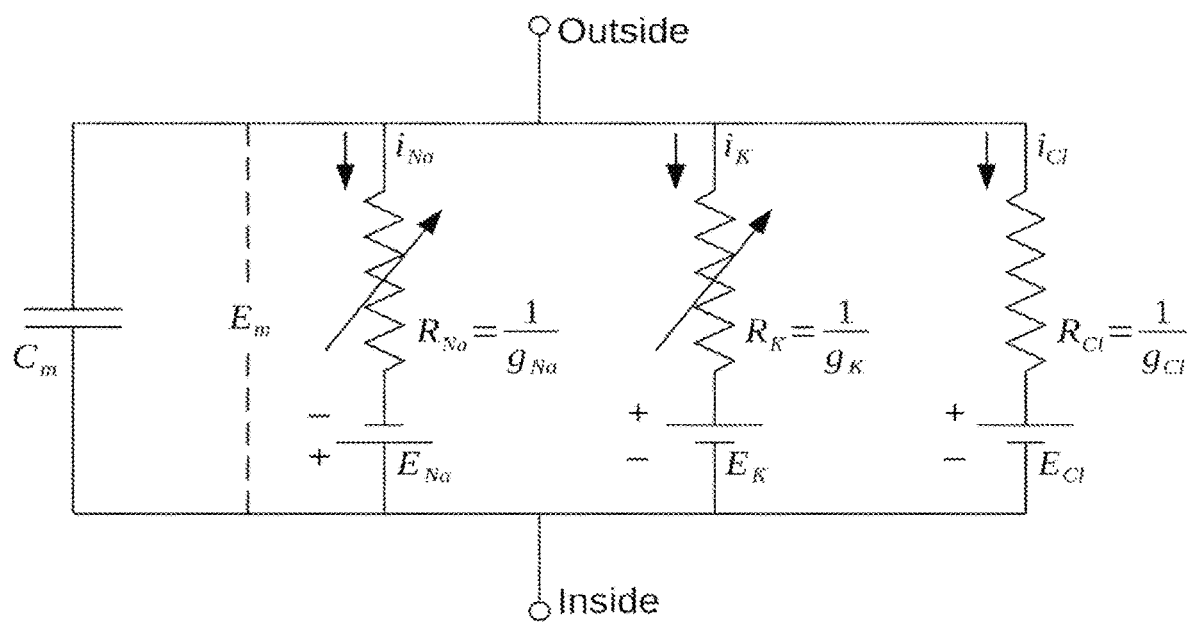
FIG. 2 shows the transmembrane ionic current model conceptualised by Hodgkin and Huxley.

Following the Hodgkin-Huxley Ionic Current Model, as shown in FIG. 2, based on the Hodgkin-Huxley formulation, and following Ohm's law, each ionic current can be defined as:

$$I_K = g_K(V_m - E_K)$$

$$I_{Na} = g_{Na}(V_m - E_{Na})$$

$$I_{Cl} = g_{Cl}(V_m - E_{Cl}) \qquad \text{Equation 3}$$

Given their Nernst potentials:

$$E_K = \frac{RT}{zF}\ln\frac{[K_0]}{[K_i]} \qquad \text{Equation 4}$$

$$E_{Na} = \frac{RT}{zF}\ln\frac{[Na_0]}{[Na_i]}$$

$$E_{Cl} = \frac{RT}{zF}\ln\frac{[Cl_0]}{[Cl_i]}$$

The conductances can be defined as:

$$g_K = \underline{g_K} n^4$$

$$g_{Na} = \underline{g_{Na}} m^3 h$$

$$g_{Cl} = \underline{g_{Cl}} \qquad \text{Equation 5}$$

Where n, m, and h are gating variables that define the gating kinetics of each ion channel. Using Kirchhoff's current law, to solve the electric circuit system in FIG. 2 to calculate the transmembrane current:

$$I_m = I_c + I_{ion} = C_m\frac{dV_m}{dt} + I_{Na} + I_K + I_{Cl} + \ldots \qquad \text{Equation 6}$$

Therefore, the transmembrane potential can be estimated as:

$$-C_m\frac{dV_m}{dt} = \qquad \text{Equation 7}$$

$$\underline{g_K} n^4(V_m - E_K) + \underline{g_{Na}} m^3 h(V_m - ENa) + \underline{g_{Cl}}(Vm - E_{Cl}) + \ldots$$

where each conductance $\underline{g_K}, \underline{g_{Na}}, \underline{g_{Cl}}, \ldots$ determines the amount of current generated by each ion crossing the membrane.

The density of ion channel protein expression within cell membranes affect the molecular interactions within the cell, providing a variety of phenotypes that may determine a range of normal or diseased phenotypes. Plasticity of the protein complexes are a major determinant of cardiomyocyte function. For example, the most prevalent genetic disorder is the congenital long QT syndrome (LQTS). LQTS is caused by mutation-induced decrease in depolarising currents or by increase in depolarising currents (https://www.ncbi.nlm.nih.gov/pmc/articles/PMC4471480/or Abriel H, Rougier J S, Jalife J. Ion channel macromolecular complexes in cardiomyocytes: roles in sudden cardiac death. Circ Res. 2015;116 (12): 1971-1988. doi:10.1161/CIRCRESAHA. 116.305017).

Within the Hodgkin-Huxley model formulation, some of these fluctuations on current density can be modelled as an increase or decrease of conductances ($\underline{g_K}, \underline{g_{Na}}, \underline{g_{Cl}}, \ldots$) around their baseline values by a factor k, which would be equal to 1 if the channel conductance remains at baseline. As a consequence, the transmembrane potential can be expressed as $$-C_m\frac{dV_m}{dr} = k_K \underline{g_K} n^4(V_m - E_K) + \qquad \text{Equation 8}$$

$$k_{Na}\underline{g_{Na}}m^3 h(V_m - ENa) + k_{Cl}\underline{g_{Cl}}(Vm - E_{Cl}) + \ldots$$

The ion channel kinetics (gate variables) could also contribute to the mutation-induced variations in the action potential phenotypes, and therefore they can also be modified within the mathematical model to represent a particular diseased state.

The factors k can be used to approximate a variety of conductance values provided experimental knowledge regarding the specific remodelling measured in experimental or clinical settings.

The cell model is plugged into the tissue model as a nonlinear ordinary differential equation (ODE) system. The general form of the EP model is as follows:

$$C_m\frac{\partial V}{\partial t} + I_{ion} - I_{app}(t) = 0 \text{ where} \qquad \text{Equation 9}$$

$$I_{ion} = I_{Na} + I_{CaL} + I_{ito} + I_{Kr} + I_{NaL} + I_{CaNa} + \ldots \qquad \text{Equation 10}$$

and where V is the activation potential and Cm the membrane capacitance. $I_{app}(t)$ is the applied current, typically impulses used to impose an initial activation. $I_{ion}$ is the ionic currents term, a sum of all the ionic currents considered, and whose dynamics depends on the cell model phenomenological or mechanistic description. The O'Hara-Rudy cell model for human ventricles is used here to model all the critical transmembrane currents and cell type differentiation, but any cardiomyocyte model can be employed to reproduce the single cell transmembrane voltage dynamics. Combining both cell and tissue models, the resulting governing system is:

$$C_m\frac{\partial V}{\partial t} + \frac{\partial}{\partial x_i}\left(\frac{G_{ij}}{S_v}\frac{\partial V}{\partial x_j}\right) + I_{ion} - I_{app} = 0 \qquad \text{Equation 11}$$

where $G_{ij}$ is the conductivity tensor and $S_v$ the surface-to-volume ratio. $G_{ij}$ depends on the position and is computed at each point from the fiber local system $(f_i, n_i, t_i)$, respectively, the longitudinal, normal, and transversal direction normalized vectors as follows:

$$G_{ij} = g^f f_i f_j + g^n n_i n_j + g^t t_i t_j \qquad \text{Equation 12}$$

$g_f$, $g_n$, and $g_t$ being the respective conductivities. Typically, conduction is higher along the fiber, so conductivity $g_f$ is three times larger than the transverse conductivities. In most cases, conduction is considered transversally isotropic, so $g_n = g_t$. Fibres are defined at each of the tissue discretization node through $f_i$, $n_i$, and $t_i$, which forms a local base at each node. In this way, fibre directions are defined as a nodal field following the complex anatomical description of the cardiac muscle. When electromechanical coupling is present, electrophysiology is solved in the deformed configuration, therefore modifying the conductivity term.

The system of Equation 11 is discretized using FEM and FDM for space and time, respectively, using a first order Yanenko operator splitting:

$$\text{Cell Model } (\Delta V^*): \frac{\Delta V}{\Delta t} + I_{ion}(V) - I_{app} = 0 \qquad \text{Equation 13}$$

$$\text{Tissue Model } (\Delta V^-): \left(\frac{M}{\Delta t} + G\right) \Delta V^- = -GV^*, \text{ where}$$

$$\text{Update } (V^{n+1}): V^{n+1} = V^n + \Delta V^* + \Delta V^-$$

In Equation 13, $\Delta V^* = V^* - V^n$ is the unknown difference between two time steps, M is a mass matrix and G a stiffness matrix.

The solid mechanics model is as follows. $X_j$ can be defined as a material point in the reference (or material) configuration and $x_i$ the corresponding point in the deformed configuration. The equation of balance of momentum with respect to the reference configuration can be written as follows:

$$\rho^s \frac{\partial^2 u_i}{\partial t^2} = \frac{\partial P_{ji}}{\partial X_j} + \rho^s b_i \qquad \text{Equation 14}$$

where $u_i$ is the unknown, $\rho_s$ is the tissue density (with respect to the reference volume). Tensor $P_{ji}$ and vector $b_i$ stand for, respectively, the first Piola-Kirchoff stress tensor (nominal stress) and the distributed body force in the undeformed configuration. The Cauchy stress $\sigma = J^{-1} PF^T$ is related to the nominal stress through the deformation gradient tensor $F_{ij} = \delta x / \delta X_j$. $J = \det(F)$ is the Jacobian determinant. In cardiac tissue models, stress is assumed to be a combination of passive and active parts:

$$\sigma = \sigma_{pas} + \sigma_{act}(\lambda, [Ca^{2+}]) f \otimes f \qquad \text{Equation 15}$$

where $f = f_i$ is the normalized vector along the fibers, already used in electrophysiology (Equation 12). The passive part is modelled as a slightly compressible, elastic, invariant-type material, and through a transverse isotropic exponential strain energy function W(b). The energy function W(b) relates to the Cauchy stress $\sigma_p$ as to the right Cauchy-Green deformation b and the strain invariants:

$$J\sigma_{pas} = (ae^{b(I_1-3)} - a)b + 2a_f(I_4 - 1)e^{b_f(I_4-1)^2} f \otimes f + K(J-1)I \qquad \text{Equation 16}$$

The strain invariants $I_1$ and $I_4$ represent the noncollagenous material and the muscle fibers stiffness respectively.

Parameters a, b, $a_f$, $b_f$ are determined experimentally. K sets the compressibility. Vector f defines the fiber direction. As the model is slightly compressible, anisotropy effects for the compressible term are neglected.

A dynamic approach is used to solution, in which cardiac tissue can be treated as viscoelastic. Rayleigh damping is used to replace viscoelastic effects in the material model and so remove spurious oscillations. After using FEM and FDM to discretize in space and time the solid mechanics differential equations, and including the Rayleigh damping term, this provides:

$$\rho^s Ma + C(u)v + K(u)u^* = B, \qquad \text{Equation 17}$$

where a, v, and u are respectively the acceleration, speed, and displacement, and B is a source term. In this equation, M is the mass matrix, K(u) is the stiffness matrix, and $C(u) = \alpha M + \beta K(u)$ is the Rayleigh damping term. $\alpha$ and $\beta$ are chosen as a function of the frequencies to damp. In the general form of the Rayleigh damping term, C is proportional to the mass M and the stiffness K of the structure. After numerical experiments, values of c=5 and $\omega$=200 Hz to provide appropriate damping.

This system can be solved explicitly. Equation 17 can be rewritten as follows:

$$\rho^s Ma = f_{vis} + f_{int} + B, \qquad \text{Equation 18}$$

where the viscous force is $f_{vis} = -c\alpha Mv$ and the internal force is $f_{int} = -K(u^n)u^n$. If $M^d$ is the diagonal mass matrix, the resulting explicit scheme is as follows:

$$a^n = \frac{M^{-1}}{\rho}(f_{vis} + f_{int} + B) \qquad \text{Equation 19}$$

$$v^{n+\frac{1}{2}} = v^n + \frac{1}{2}\Delta t a^n \qquad \text{Equation 20}$$

$$u^{n+1} = u^n + \Delta t v^{n+\frac{1}{2}} \qquad \text{Equation 21}$$

The superscripts "n" and "n+1" indicate that the variables are evaluated at time $t^n$ and $t^{n+1}$, respectively.

A bidirectional model is used for electromechanical coupling. In the electromechanical direction, the depolarization of the cell membrane triggers the mechanical deformation of the myocytes, modelled as the stress active part ($\sigma_{act}$ in Equation 15). Here a Hunter-McCulloch-ter Keurs model or a biophysically-based model (i.e. Land et al 2017) is used to describe cardiac muscle—this assumes that the active stress is produced only in the direction of the fiber and depends on the calcium concentration of the cardiac cell:

$$\sigma_{act} = \frac{[Ca^{2+}]^n}{[Ca^{2+}]^n + C_{50}^n} \sigma_{max}(1 + \beta(\lambda_f - f)), \qquad \text{Equation 22}$$

where $C_{50}$ is the calcium concentration for 50% of $\sigma^{max}$, n is a coefficient that controls the shape of the curve, $\sigma^{max}$ is the maximum tensile stress generated at the maximum extension ratio $\Delta = 1$ and $\beta$ is a parameter that scales the active stress produced.

In the opposite direction, mechano-electrical feedback is treated as a geometrical coupling (alternatively, it can be treated as stretch-activated ionic channels). This coupling can be obtained by solving the electrophysiology problem on the deformed configuration.

When solving in the deformed configuration, matrices and vectors are assembled inside a subroutine with reference nodal positions $X^a_i$ as inputs. The deformed electrophysiology is solved by simply reassigning the input to $x^a_i$. This electrophysiology assembly approach is computationally far less expensive than solid and fluid mechanics, even if matrices are recomputed at every time step.

Equation 13 computes space derivatives using the nodal coordinates on the deformed configuration and, instead of G obtained from Equation 12, a transformed diffusion matrix Ga:

$$G_d = J^{-1} F G F^T \qquad \text{Equation 23}$$

Computational fluid dynamics (CFD) inside cavities and vessels is modeled by the incompressible flow Navier-Stokes equations for a Newtonian fluid on a deformable mesh using an arbitrary Lagrangian-Eulerian (ALE) scheme. Flow equations are as follows:

$$\rho^f \frac{\partial v_i}{\partial t} + \rho^f (v_j - v_j^m) \frac{\partial v_i}{\partial x_j} + \qquad \text{Equation 24}$$

$$\frac{\partial}{\partial x_j}\left[+p\delta_{ij} - \mu\left(\frac{\partial v_i}{\partial x_j} + \frac{\partial v_j}{\partial x_i}\right)\right] = \rho^f f_i$$

$$\frac{\partial v_i}{\partial x_i} = 0, \qquad \text{Equation 25}$$

where $\mu$ is the viscosity, $\rho f$ is the fluid density, $v_i$ is the velocity, p is the mechanical pressure and $v^m_j$ is the mesh velocity. To solve Equations 24 and 25 in a compact manner, we define v:=vi and let $\epsilon$ and $\sigma$ be the velocity rate of deformation and the stress tensors respectively, defined as follows:

$$\epsilon(v) = \frac{1}{2}(\nabla v + \nabla v^T) = \left(\frac{\partial v_i}{\partial x_j} + \frac{\partial v_j}{\partial x_i}\right) \qquad \text{Equation 26}$$

$$\sigma = -pI + 2\mu\epsilon(v) \qquad \text{Equation 27}$$

With this, we can define vector with the unknowns $U=[v,p]^T$, a differential operator $\mathcal{L}(U)$ and a force term F as follows:

$$\mathcal{L}(U) = \left[\rho^f[(v-v^d)\cdot\nabla]v - \nabla\cdot[2\mu\epsilon(v)] + \nabla_p\right] \text{ and } F = \left[\rho^f f\right] \quad \text{Equation 28}$$

$$\mathcal{L}(U) = [\nabla\cdot v] \text{ and } F = [0]$$

$$\mathcal{L}(U) = \begin{bmatrix} \rho^f[(v-v^d)\cdot\nabla]v - \nabla\cdot[2\mu\epsilon(v)] + \nabla_p \\ \nabla\cdot v \end{bmatrix} \text{ and } F = \begin{bmatrix} \rho^f f \\ 0 \end{bmatrix}$$

where the domain velocity $v^d$ becomes the mesh velocity $v^m$ once the equation is discretized. If the matrix M=diag ($\rho f I, 0$), where I is the identity tensor, we can write the incompressible Navier-Stokes equation in the compact form:

$$M\delta_t U + L(U) = F \qquad \text{Equation 29}$$

The numerical model is based on FEM for space and FDM for time, using the variational multiscale (VMS) technique to stabilize convection and pressure. The formulation is obtained by splitting the unknowns into grid and subgrid scale components, $U=U_h+\tilde{U}$. This subgrid scale $\tilde{U}$ is also modeled. We can define $R(\tilde{U})$ the Navier-Stokes residue as:

$$R(\tilde{U}) = F = M\delta_t U - L(U) \qquad \text{Equation 30}$$

So, the expression $$\tilde{U} = \tau R(\tilde{U}) \qquad \text{Equation 31}$$

is then considered for stabilization where t is a diagonal matrix, depending on the convection velocity. The resulting system is solved through a velocity-pressure splitting strategy. Time discretization is based on second order backwards differences, and linearization is carried out using Picard's method. At each time step, the system $$\begin{bmatrix} A_{vv} & A_{vp} \\ A_{pv} & A_{pp} \end{bmatrix} \begin{bmatrix} u \\ p \end{bmatrix} = \begin{bmatrix} b_v \\ b_p \end{bmatrix} \qquad \text{Equation 32}$$

must be solved for velocity (u) and pressure (p) vectors. In order to solve this system efficiently in supercomputers, a split approach is used. The Schur complement is obtained and solved using an Orthomin(1) algorithm. To do so, the momentum equation is solved twice using GMRES (generalized minimal residual method) and the continuity equation is solved with the deflated conjugate gradient (DCG) algorithm.

The ALE scheme requires the solution of another discretized partial differential equation for the mesh movement. We use an approach which is robust and allows us to preserve mesh structure at boundary layers or around fine grain geometry features. Mesh movement is governed by the following Laplacian equation:

$$\frac{\partial}{\partial x_j}\left([1+\alpha^e]\frac{\partial b_i}{\partial x_j}\right) = 0, \qquad \text{Equation 33}$$

which is solved using FEM to discretize the space. In this equation, $b_i$ are the components of the displacement at each point for the domain. The factor $a^e$ controls the mesh distortion depending on the minimum and maximum element volumes in the mesh:

$$\alpha^e = \frac{1 - V_{min}/V_{max}}{V_e/V_{max}} \qquad \text{Equation 34}$$

In this way, while small elements remain almost undeformed, large elements suffer the largest deformations. This equation is solved with a deflated conjugate gradient algorithm—this is computationally cheap, because diffusion coefficients are computed only once at preprocess. Arbitrary Lagrangian-Eulerian (ALE) boundary conditions at the contact surface are set through the nodal displacement from the solid mechanics problem. The equation is discretized by FEM in space and by FDM in time, resulting in a simple diffusion problem.

In addition to the computational fluid dynamics itself, the fluid-structure interaction needs to be considered as a fourth problem, as discussed above. Mechanical deformation and fluid dynamics is coupled at the wet surface, which is the contact boundary or interface between blood (simulated using CFD) and tissue (simulated using CSM). At the discrete level, continuity of displacements ($^{CFD}d_i^{\Gamma_c}$,$^{CSM}d_i^{\Gamma_c}$) and normal stresses ($^{CSM}\sigma_{ij}^{\Gamma_c} n_j$, $^{CFD}\sigma_{ij}^{\Gamma_c} n_j$) CFD and CSM, respectively, in the wet surface $\Gamma c$ must be enforced:

$$^{CFD}d_i^{\Gamma_c} = {}^{CSM}d_i^{\Gamma_c}$$

$$^{CFD}\sigma_{ij}^{\Gamma_c} n_j = {}^{CSM}\sigma_{ij}^{\Gamma_c} n_j \qquad \text{Equation 35}$$

The normal stresses ($^{CFD}\sigma_{ij}^{\Gamma_c} n_j$) are translated as a surface force applied in the contact boundary $\Gamma c$ as follows:

$$g_i = {}^{CFD}\sigma_{ij}^{\Gamma_c}\cdot n_j \qquad \text{Equation 36}$$

where $n_j$ is the normal to the surface. The mesh is constructed to be conforming, having coincident nodes at $\Gamma_c$, avoiding interpolation approximations that may lead to non-conservativeness of the coupling variables.

There are three requirements for the FSI algorithm in this problem. Firstly, as the solid and fluid densities are very similar and the added mass instability is prone to appear, the algorithm must be robust enough to tackle this issue. Secondly, due to the computational strategy adopted for the multi-physics simulations, we need a strongly coupled staggered approach. Thirdly, as both fluid and solid mechanics problems are potentially very large, both problems should run following a parallel programming strategy, which requires a coupling algorithm efficient enough to avoid bottle necks in point-to-point parallel communications. To overcome these issues, a modified version of the interface quasi-Newton (IQN) algorithm was developed, named as compact IQN(CIQN).

Briefly explained, the problem is split in the fluid and solid domains with a Dirichlet-Neumann decomposition approach. In this way, the CSM problem can be defined as $d_a^{I+1} = CSM(f_a)$ and the CFD problem as $f_a^{I+1} = CFD(d_a)$, where the Greek subindex represents the degrees of freedom (DoF). With this, the fixed-point algorithm for each iteration can be written as $d_a^{I+1} = CSM(CFD(d_a))$ or $f_a^{I+1} = CFD(CSM(f_a))$. In a generic manner, the problem can be stated as $\tilde{x}_a = H(x_a)$. We can define the next iterate as $x_a^{I+1} = \tilde{x}_a + \Delta x_a$. The unknown increment $\Delta x_a$ can be approximated as follows:

$$\Delta x_a = W_{ai} \lambda_i \qquad \text{Equation 37}$$

where $W_{ai}$ is a matrix containing in each column the unknown increments $\Delta \tilde{x}_a^{I-1} = \tilde{x}_a^{I-1} - \tilde{x}_a$. Finally, $\lambda_i$ is obtained by solving the following problem:

$$V_{aj} \lambda_j = r_a \qquad \text{Equation 38}$$

where $r_a = \tilde{x}_a - x_a$ is the residue for the interface problem and $V_{aj}$ contains in each column the residual increments for the interface problem $\Delta r_a^{I-1} = r_a^{I-1} - r_a$.

Figure 4:
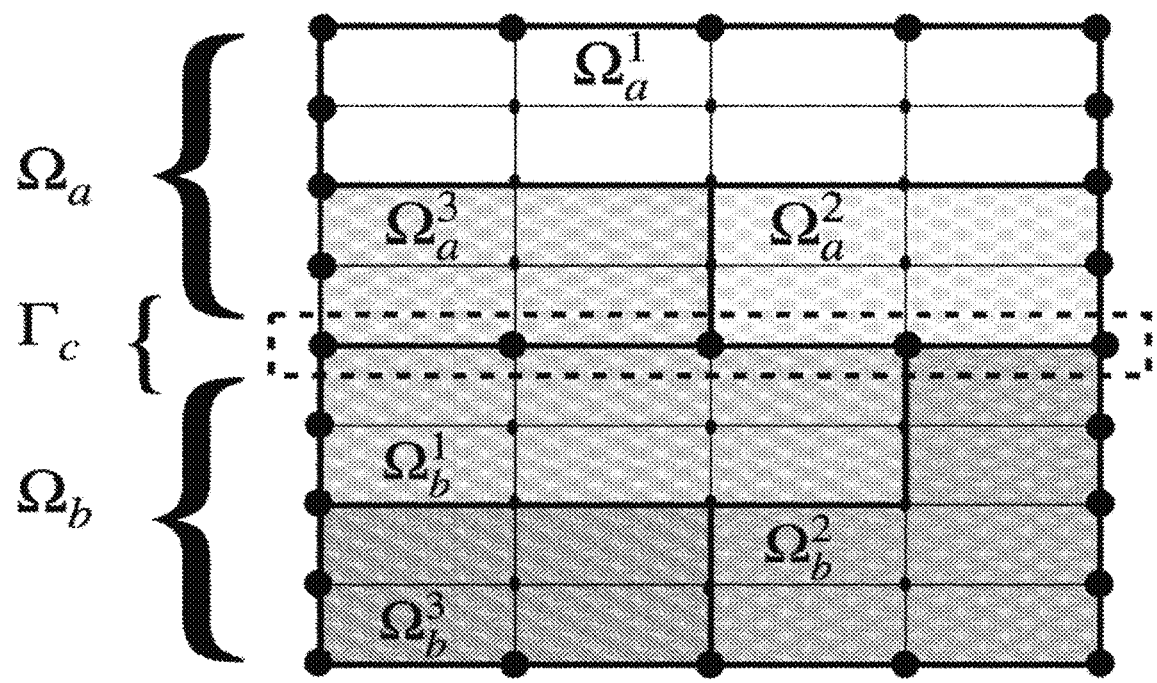
FIG. 4 shows an example representation of the implementation of high-performance computing for the described simulations, involving subdomain partitioning and intercommunication between said subdomains. Physical subdomains $\Omega a$ and $\Omega b$ are in contact with the wet surface $\Gamma c$, where each subdomain is subdivided into three partitions.

The computational approach to simulation will now be described in more detail. In embodiments, two instances of suitable simulation code—an example is ALYA, simulation code developed at the Barcelona Supercomputing Centre for multiphysics simulations using High Performance Computing, described in Casoni et al, "Alya: Computational Solid Mechanics for Supercomputers", Arch Computat Methods Eng (2015) 22:557-576—are executed simultaneously. The fluid mesh deformation (ALE problem) and fluid mechanics (CFD problem) are computed in one instance. Electrophysiology (EP problem) and solid mechanics (CSM problem) are computed in the other instance. At run time, each instance is partitioned in subdomains, each subdomain being pinned to an MPI task. In order to have efficient communication among the instances, an MPI point-to-point communication scheme is set. This scheme allows that each of the subdomains with at least one element on the wet surface (separating two different materials, such as blood and tissue) will communicate only with its subdomain wet surface element counterpart at the other material, as shown in FIG. 4. In FIG. 4, $\Gamma c$ is the wet surface separating two different materials $\Omega a$ and $\Omega b$. Each material is being simulated on a different parallel Alya instance and partitioned in three subdomains—this means that in the FIG. 4 example, the joint run uses a total of six MPI-tasks. Following an efficient MPI point-to-point communication scheme and according to the figure, subdomain $\Omega_3^a$ in the upper material must only communicate with $\Omega_1^b$, and $\Omega_2^a$ only with $\Omega_1^b$ and $\Omega_2^b$. The solution scheme is shown in FIG. 4. After initialization, for each time step, the parallel solvers are executed in a staggered way: electrophysiology/mechanical deformation on the "tissue" Alya instance, and fluid mesh deformation/fluid mechanics on the "blood" Alya instance:

1. Instance Tissue: (a) Solve electrophysiology, update activation potential and ion concentration using the last solid displacements (b) Solve solid mechanics, update solid displacement using the last ion concentration
2. Instance Tissue transfers the wet surface nodal velocity to the Instance Blood.
3. Instance Blood: (a) Solve mesh deformation, update mesh displacements (b) Solve fluid mechanics, update pressure velocity and pressure
4. Instance Blood transfers the wet surface nodal force to the Instance Tissue.
5. Repeat.

Using a Gauss-Seidel scheme to solve this system of equations, the basic computational approach is essentially:

while Time loop do $$d_a = d_a^{ini}$$

while Coupling loop do $$d_a = EP + CSM(f_a)$$

$$f_a = ALE + CFD(d_a)$$

$$f_a^{I+1} = \varphi_{GS}(f_a)$$

end end where $\varphi_{GS}$ represents the relaxation algorithm, $d_a$ and $f_a$ the displacements and forces in the interface, and electrophysiology (EP), computational solid mechanics (CSM), arbitrary Lagrangian-Eulerian (ALE), and computational fluid dynamics (CFD) the different problems involved.

A practical human heart geometry, including ventricles, atria, and great vessels, can be based on the Zygote Solid 3D Heart Model. This geometry represents the 50th percentile US 21-year-old Caucasian male (claimed average error under 5%). Images were reconstructed from 0.75 [mm] thick MRI slices. Even though the acquisition and reconstruction were performed during 70% diastole, the geometry is still subjected to some residual stresses.

However, and due to the known condition of end-diastolic configuration, we assume that the geometry is stress free. ANSA meshing software can be used to modify the geometry and generate the computational mesh. The main features of the obtained geometry are as follows:

The nonspecific structures are removed (i.e. fat and coronary vessels).

The valvular leaflets are removed, closing the space with a plane surface in the atrioventricular planes.

The geometry surfaces are modified to make them fit between each other.

The atria are filled with an isotropic lineal solid material.

The inner surfaces of the endocardium are smoothed.

For this systole simulation, atrioventricular valves are considered completely closed and aortic and pulmonary semilunar valves are considered completely opened. In this simulation, the atria have no other purpose than providing a better passive mechanical behaviour of the model, especially in terms of inertia. Then, it is included as a solid passive material, with a density of $\rho = 1.04$ [g/cm3], a Young's modulus of $E = 5$[Ba], and a Poisson ratio of $v = 0.0005$.

Here, both electrophysiology and solid mechanics are solved on the same mesh, and both problems are executed simultaneously on the same code with parallel performance that is equivalent in both cases, without any type of bottleneck. While electrophysiology is often considered to have higher mesh requirements that solid mechanics, using the same mesh avoids problems of using two meshes on the same physical domain, such as the need for an efficient interpolation technique and the risk of convergence issues.

Fiber and cell distributions are necessary for determining the electrical depolarization and mechanical deformation of the myocardium. Rule-based methods are used for fiber distribution, as although distribution can be established ex vivo by diffusion tensor MRI, it is not currently available in vivo. Existing rule-based methods find the relative position of each node in the heart to assign a fiber direction and cell tag.

Here, the fiber distributions for the LV and the RV are created using a rule-based algorithm. For each node in the ventricles, the minimal distance to endocardium and epicardium is computed ($d_{endo}$, $d_{epi}$). After this, a thickness parameter e is defined:

$$e = \frac{d_{endo}}{d_{endo} + d_{epi}} \quad \text{Equation 39}$$

The fibers are built orthogonally to the local base generated, ensuring a smooth angle variation. Fiber orientation is then determined by $$\alpha = \frac{\pi}{3}(1 - 2e)^n \quad \text{Equation 40}$$

where n determines a linear (n=1) or cubic (n=3) variation. + and − π/3 are the maximum and minimum angles for the fibers.

Through Equation 39 cell types are also assigned: the first ⅓ are endocardial cells, the second ⅓ are mid-myocardial cells and the last ⅓ are epicardial cells, each type with slightly different electrophysiology parameters.

Deformation of the ventricles involves a longitudinal displacement of the valvular plane towards the apex of the ventricle, inducing apex-base shortening. This means that some care needs to be taken with relevant boundary conditions to ensure proper deformation of the ventricles. Here, normal displacements are restricted ($d_i n_i = 0$) at the ventricular pericardium for the deformed configuration while free displacements are allowed at the tangential planes, so letting the boundary slide. The only difference with the contact problem solved at Fritz et al (Simulation of the contraction of the ventricles in a human heart model including atria and pericardium: finite element analysis of a frictionless contact problem. Biomech Model Mechanobiol. 2014; 13 (3): 627-641) is that they impose dini=0 for the surface at the reference configuration. This "sliding pericardium" condition is imposed in only part of the pericardium, leaving the region near to the valve plane free to allow a more uniform deformation.

Boundary and initial conditions for the three main problems are as follows:

Electrophysiology—The boundary conditions are zero normal electrical flux everywhere, imposed as a natural finite elements Neumann condition. Except as specified to the contrary, the left and right endocardium are excited synchronously as the initial condition. As assumed in the the computational electrophysiology literature, exciting the whole inner ventricle surface, is a good approximation for the Purkinje system.

Solid Mechanics—For the epicardial region, except as otherwise specified, the sliding pericardial boundary condition described above is used. When simulating fluid-electro-mechanical coupled problems, on the wet surface (i.e. the endocardium), the continuity of stresses and displacements for fluid and solid is handled as described above. Finally, except where explicitly identified to the contrary, the rest of the outer surfaces is free to deform.

Fluid Mechanics—As stated in Equation 35, we enforce continuity of unknowns in the wet surface and no slip condition v=0 for the fluid mechanics problem. For the outflow $\Gamma_{out}$, we use a stabilized boundary condition:

$$n^T \sigma n + C_d \int_{\Gamma_{out}} v n d\Gamma_{out} + p_0 = 0 \quad \text{Equation 41,}$$

with $$\sigma n = -pn + 2\mu \nabla v \cdot n - \rho^f(\{v \cdot n\}_-)v \quad \text{Equation 42}$$

where ρf is the fluid density and the term {v·n}− denotes the negative part of v·n, this is to say {v·n}−=v·n if v·n>0 or {v·n}−=0 otherwise. The term $n^T \sigma n$ stabilizes the outflow, while the integral term in Equation 41 acts as an order zero Windkessel model, imposing a pressure proportional to the outflow.

Bulk properties used in the model are set out in Table 1 below:

TABLE 1

Bulk properties used in the model for electrophysiology, solid mechanics, and fluid dynamics[a]

| Problem | | Property | Value | |
| --- | --- | --- | --- | --- |
| EP* | | Conductivity, $G_{kl}$ | 1.17E−3, 3.90E−4, 3.90E−4 | [mS/cm] |
| | | Surface-to-volume ratio, $S_v$ | 0.1 | [1/cm] |
| | | Capacitance, $C_m$ | 1.0 | [μF/cm$^2$] |
| CSM | Myocardium, | Density p$^s$ | 1.04 | [g/cm$^3$] |
| | atria, vessels | Parameter a | 27950.0 | [Ba] |
| | | Parameter b | 6.3219 | [—] |
| | | Parameter $a_f$ | 10952.0 | [Ba] |
| | | Parameter $b_f$ | 10.26 | [—] |
| | | Parameter K | 10.0 | [Ba] |
| | Atria | Density p$^s$ | 1.04 | [g/cm3] |
| | filling | Young modulus E | 5 | [Ba] |
| | | Poisson ratio ε | 0.0005 | |
| | CFD | Density, p$^f$ | 1.04 | [g/cm$^3$] |
| | | Viscosity, μ | 0.04 | [Poise] |

Available data relating to a specific patient can be used to select an existing model which is best suited as a starting point (for example, having a similar age, sex, size or heart geometry to the patient), and/or to make initial adjustments to the standard model.

Functional Elements and Governing Cell Models

Figure 5:
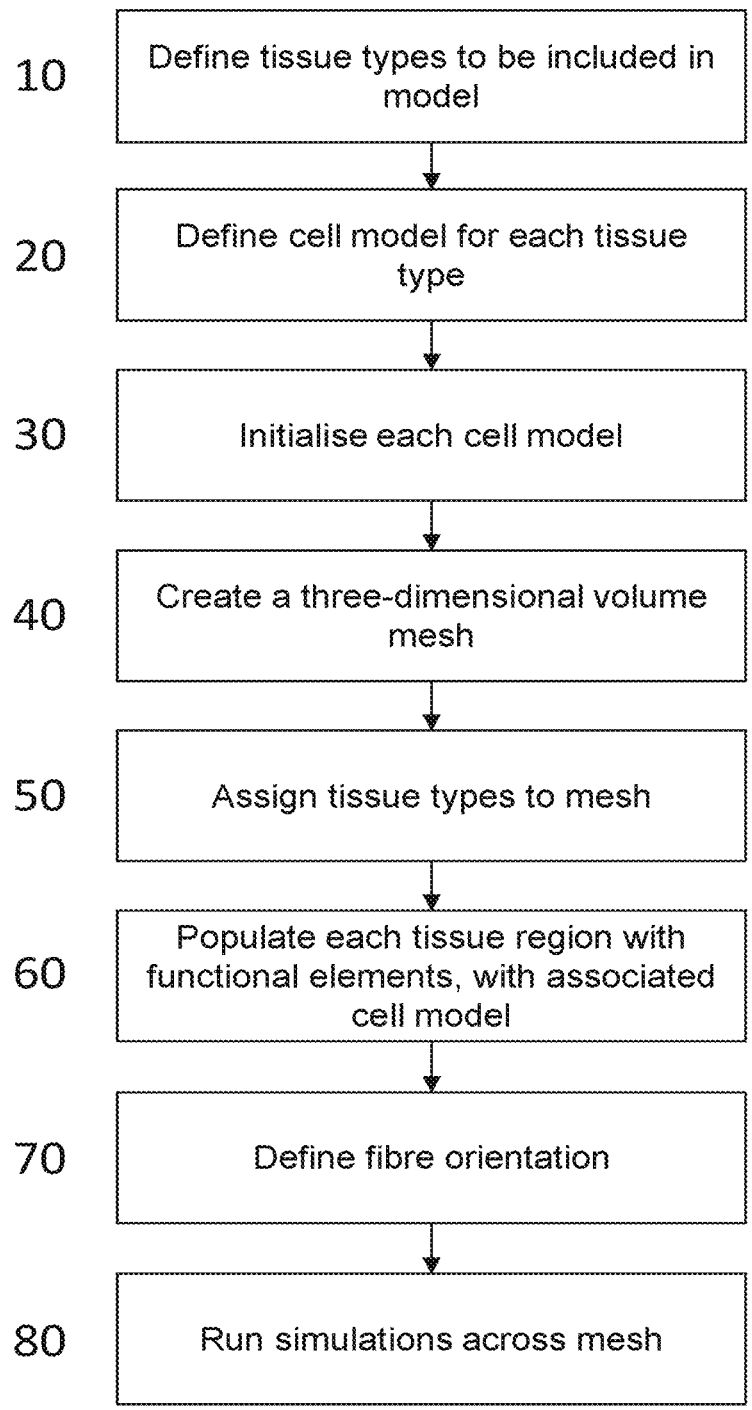
FIG. 5 shows the major steps in a method of simulating muscular tissue according to one or more embodiments described herein.

An indication of the steps involved with an example method to generate a model and carry out simulations is shown in FIG. 5. Methods for generating models as described herein involve constructions of a three-dimensional volume mesh comprising a plurality of functional elements, wherein each functional element has associated with it a governing cell model comprising a system of ordinary differential equations describing one or more electrophysiological and/or electromechanical parameters, in order to simulate the activity of a muscular tissue or organ, such as the heart.

These functional elements do not necessarily or even in general represent single cells, as the inclusion of a separate model for each of the cells in the heart would usually not be computationally feasible. Rather, the functional elements represent activity of a continuous volume of similar cells in a particular tissue type. In more abstract terms, the functional element can represent the solution to the ODE representing the kinetics of a variety of ion channels that describe a particular population of similar cell types that are located in a regional volume space within a heart simulation.

Depending on the purpose of the model to be constructed, it may not be necessary or desirable to include all the possible features and parameters which are set out in the equations described above. For example, if it is desired only to model the spread of excitation across and through the modelled organ, rather than its mechanical activity, it may not be necessary to include parameters relating to electromechanical coupling. Such simulations can already provide important insights into problems like arrhythmia. Purely electrophysiological simulations can be created in this way. Electromechanical behaviour can be added to these simulations at a later stage to extract markers that resemble clinical cardiac data, like hemodynamic information. Therefore, the type of model to be produced can be selected based on the target biomarker to be obtained, such as electrophysiology information or haemodynamic and mechanic markers.

With this in mind, electrophysiological parameters included in the cell models may relate to one or more of ion channel conductance, transmembrane voltage, and a calcium transient. Electromechanical parameters included may relate to one or more of stiffness, stress, strain, elasticity, and contractility.

To reflect the heterogeneity of heart tissue, models as described herein may comprise multiple tissue types which are defined as part of the generation of a model (10). As is shown in the examples above, tissue types are characterized by the different cell models (20) governing the functional elements which will populate said tissue in the whole organ model, expressed by the different ODE governing the kinetics within. For example, one or more of the modelled transmembrane ion channels may have different conductance kinetics that are also affected by drug administration, the values for the transmembrane voltage potential may differ at one or more points during the action potential, the speed of conduction may be different, or the contractile activity may vary. For example, a myocardial infarction can be represented by a perturbation of various ion channel conductances to reproduce the damaged tissue behaviour in a particular spatial location within the heart muscle. The contractile function will also be reduced by the effect of ion channel kinetics plus stiffening of the muscle due to fibrosis.

The representation of different tissue types is of particular importance for the simulation of heart tissue, as the heterogeneity of the heart is of high importance in the spread of activation throughout the tissue, and the resultant coordinated contraction. Frequently, these tissue types correspond to 'transmural cell heterogeneity'—the different properties of cells at different positions within the walls of heart. As a result, the tissue types often represented in heart models as described herein correspond to endocardial, midmyocardial and epicardial tissue. As mentioned, of particular importance is the representation of tissue which allows for the spread of activation throughout the heart, known as the Purkinje tissue. This tissue is located beneath the endocardium in the subendocardium, and may be present in models as described herein as a tissue type separate to the endocardial tissue, or these tissues may be treated together. For example, the Purkinje network can be approximated as a fast endocardial layer with a thickness of approximately 300 to 500, typically approximately 400 microns.

The parameters assigned to the cell models can vary according to the details of the organ to be modelled, in particular the characteristics of the individual or group that is to be modelled. For example, sex differences have been determined between cardiomyocyte physiology, such as action potential prolongation, which leads to lengthening of total repolarisation time, in a female phenotype (Sacco et al., in preparation).

The cell model stage aims to define all variations to the cell that will subsequently define tissue behaviour in the three-dimensional organ model, after any perturbation. The various conditions which the models as described herein aim to simulate often involve changes to the input or calculations carried out by the cell models. For example, factors such as a different heart rate, drug action, disease state such as infarction or ischemia, or transmural cell heterogeneity; could each be first modelled as changes to the cell models, before those changed cell models are used to generate a three-dimensional organ model. As a result, each time a different condition is tested, a new model may be generated, starting with the development of cell models to represent that condition.

Establishing a Steady State

Figure 6:
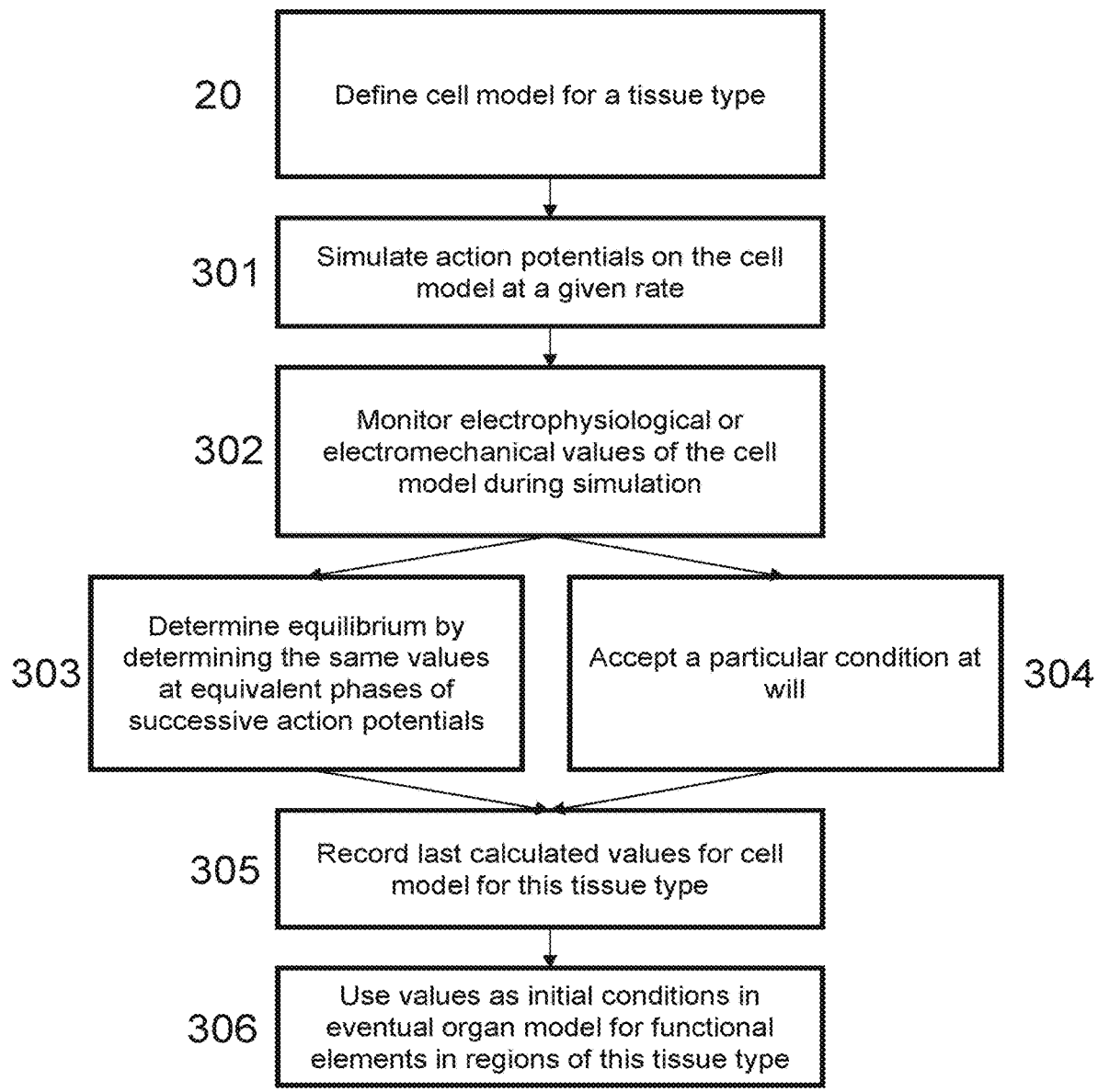
FIG. 6 shows an example representation of the steps involved with initializing a cell model by simulating multiple action potentials.

A heart beats constantly over the life of an individual, of course, and it is therefore necessary to account for the fact that any simulation must reflect that the heart muscle is constantly in a state of recovery from a previous action potential and initiation of the next. In terms of a model, this is represented by the cell model for each functional element being initialised in a state where its values reflect such previous activity. An example representation of the steps involved with representation of the steps involved with initialising a cell model (30) by simulating multiple action potentials is shown in FIG. 6. As a result, generating a full three-dimensional model can first involve simulating action potentials for one or more of the cell model types (typically each of these types) corresponding to the functional elements for the tissue types which are to be used to construct the eventual organ model, at a given action potential rate (301), until a steady state is reached. The purpose of this is to define the initial conditions for each cell within a particular tissue type.

In this context, a steady state can refer to an equilibrium being reached where one or more of the electrophysiological or electromechanical values of the cell models (302) return to the same value at the same phase of each action potential (303). This can be determined, for example, by the root mean squared error of such values falling below a particular threshold. Examples of values which can be used for this determination particularly include action potential magnitude or calcium transient magnitude. Importantly, it is not necessary for a steady state to be fully achieved, as the user can choose whether a particular condition can be accepted, if preferred (304). The ability to accept a condition is important given that the single cell behaviour is different to the coupled tissue behaviour due to the electrotonic coupling. A single cell model that may not reach steady state during a first initialization, can instead reach such a steady state when it is coupled to the tissue and it may be important towards the arrhythmic behaviour at the tissue level.

Once a steady state is achieved or accepted, the last values calculated (305) for each cell model's various electrophysiological or electromechanical parameters (that is, the inputs to the various ODE used to represent the functional element's activity) are used as an initial condition, for every point on the eventual organ model where that cell model is used to govern functional elements (306).

Generating the Three-Dimensional Organ Model

As mentioned, the three-dimensional organ to be modelled is represented by a volumetric mesh or 'volume mesh'. For example, the heart is modelled as a mesh representing all the functionally relevant volumes of the heart. Different regions of the mesh are labelled according to heart anatomy and function: ventricles, atria, valves, vessels, pericardium and epicardium, conduction system, diseased tissue (if any), and so on. By labelling the regions, specific behaviours can be assigned to each of them, such as boundary or initial conditions, physiological model, material properties, governing equations, etc. The labelled mesh and the complete model description for each of the labels represents the simulation theatre or scenario, which carries all the information needed to feed, in a well-defined format, the simulation program.

Figure 7:
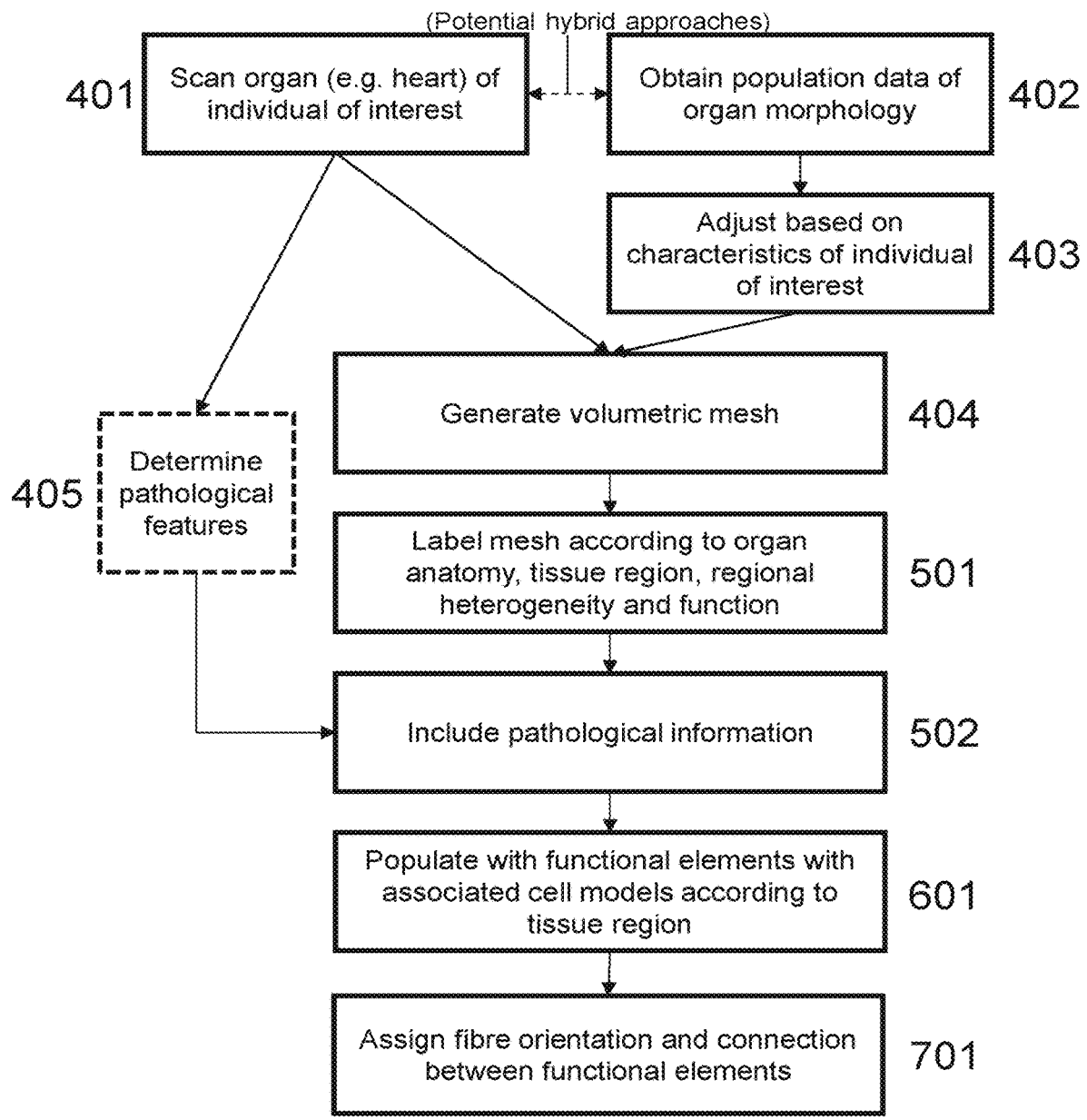
FIG. 7 shows an example representation of the steps involved with creating and populating a three-dimensional volume mesh.

The source of the volume mesh used for models as described herein can vary depending on the context and the purpose of the model in question. An example of the steps involved in the creation of a mesh (40) can be seen in FIG. 7. Where the objective is to investigate the function of the heart of a particular individual, a scan of that individual's heart can be used to define the volume mesh used (401). Scans can be of any suitable type as known to the person of skill in the art, such as MRI, CT, CAT, PET, PET/CT, X-ray, ultrasound, and so on. This can be of particular use when assessing the impact of particular structural defects, such as congenital conditions like septal defects, hypertrophy, hypoplasia, overriding aorta, stenosis, blockage and so on (405). In addition, where patient specific data is to be used at a later stage, such as by tagging an area defined as comprising scar tissue, it can be helpful to use an initial mesh as close as possible to the morphology of the heart of the patient in question, so that a tagged region can be accurately applied.

Alternatively, if the objective is to investigate function or reaction of hearts representative of the general population, and/or to create a virtual population, a mesh can be generated from population data (402), such as in vivo scans of particular individuals, or morphology based on post-mortem investigation. Such methods can take an average morphology between multiple example organs, to represent a theoretical average organ. The example organs can be selected in order to create an average representation of the organ of a particular group, for example by age or sex (403). Conversely, examples can be taken from or between the extremes of morphology present in particular groups, to investigate the differences which may result. Of course, hybrid methods of the above approaches can be used, for example if it is impractical to take a detailed scan of the organ morphology of an individual, gross morphology can be determined using such a scan, and more detailed aspects (such as the endocardial structures discussed below) can be generated based on an average model for that individual's group. Alternatively, pathological information such as a mapping of an infarction scar can be registered to a mesh representative of an individual's group (405, 502). In the model, the different pathologies and comorbidities are specifically parameterized to reflect the diseased heart behaviour. In this way, a primary disease can be simulated, as well as the impact of comorbidities.

An advantage of the models described herein is that they can take advantage of increased levels of detail within the organ to be simulated, if available. For example, the human heart possesses a complex network of endocardial tissues, such as trabeculae and false tendons which are usually overlooked in existing cardiac models. These structures create 'shortcuts' on the propagation of activation, resulting in a more synchronous contraction of the heart. Hence, they play an active role on the outcome of therapies like cardiac resynchronisation (the coordination of heart function using a pacemaker). Furthermore, their arrangement also aids in the propulsion of blood from the cardiac cavities and also plays an important role in their contractile function. Models generated in sufficient detail to include these structures can demonstrate significantly different characteristics compared to 'smooth' models without these details.

The volume mesh, once selected or generated (404), has tissue regions assigned to different areas within the mesh (50, 501). The tissue regions correspond to each of the plurality of tissue types and regional heterogeneities. Regional heterogeneities can exist within tissue types, relating to differences associated with position in the organ. For instance, in the heart, there is cell heterogeneity associated with apical-basal position in the heart. In some embodiments, this can be modelled by modifying the conductance of the slow delayed rectifier potassium current $IK_s$ following a linear gradual decay from apex to base.

The tissue regions are then populated with functional elements governed by cell models initiated as described above (60, 601), with the distribution of these functional elements according to the distribution of the tissue types which those functional elements and cell models represent, accordingly labelled in the simulation scenario. For example, to represent transmural myocyte heterogeneity, the cardiac walls can be populated by functional elements representing endocardial, mid-myocardial and epicardial tissue types. In some embodiments, this assignment can be distributed as follows: endocardial (inner 25-35%, typically 30%), mid-myocardial (middle 35-45%, typically 40%) and epicardial (outer 25-35%, typically 30%).

As previously mentioned, the myocardium structure can be characterised as an anisotropic material and more specifically as an orthotropic material. The myocardium tissue model can be assigned a fibre orientation and connection to neighbouring functional elements (70, 701), arising from the alignment of muscular cells and leading to mechanical contraction. In the case of the heart, the tissue models can be assigned a helicoidal orientation with respect to the apical-basal axis of the heart to facilitate the pumping action when coordinated contraction occurs. A rule-based model can be used to define fibre orientations (Doste et al "A rule-based method to model myocardial fiber orientation in cardiac biventricular geometries with outflow tracts." Int J Numer Method Biomed Eng. 2019). The electrophysiological connection between functional elements can be governed with a conductivity parameter, which can vary based on the orientation of the relevant functional elements, their position in the heart, and the tissue region to which they belong. For example, the Purkinje tissue and/or endocardial layer can be characterised with a particularly fast conductivity between functional elements.

Functional elements populating trabeculae and false tendons can be aligned based on the longitudinal direction of these structures. Transition between cardiomyocytes within trabeculae and endocardium can be smoothed according to the angle formed between the structure and the endocardial wall.

Tagged regions of interest can be applied to the produced three-dimensional model, which can relate to areas of tissue damage or abnormality, such as infarct scar, ischaemia, and other conditions.

Simulations Across the Three-Dimensional Models

Figure 3:
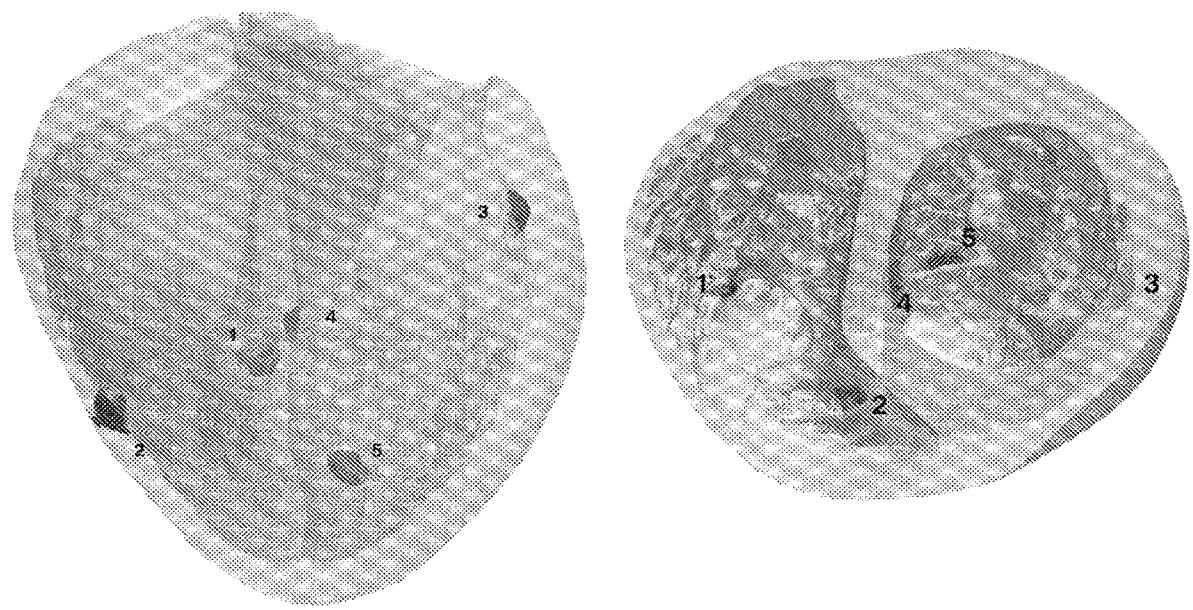
FIG. 3 shows example initial activation regions which can be selected on models of a heart.
Figure 8:
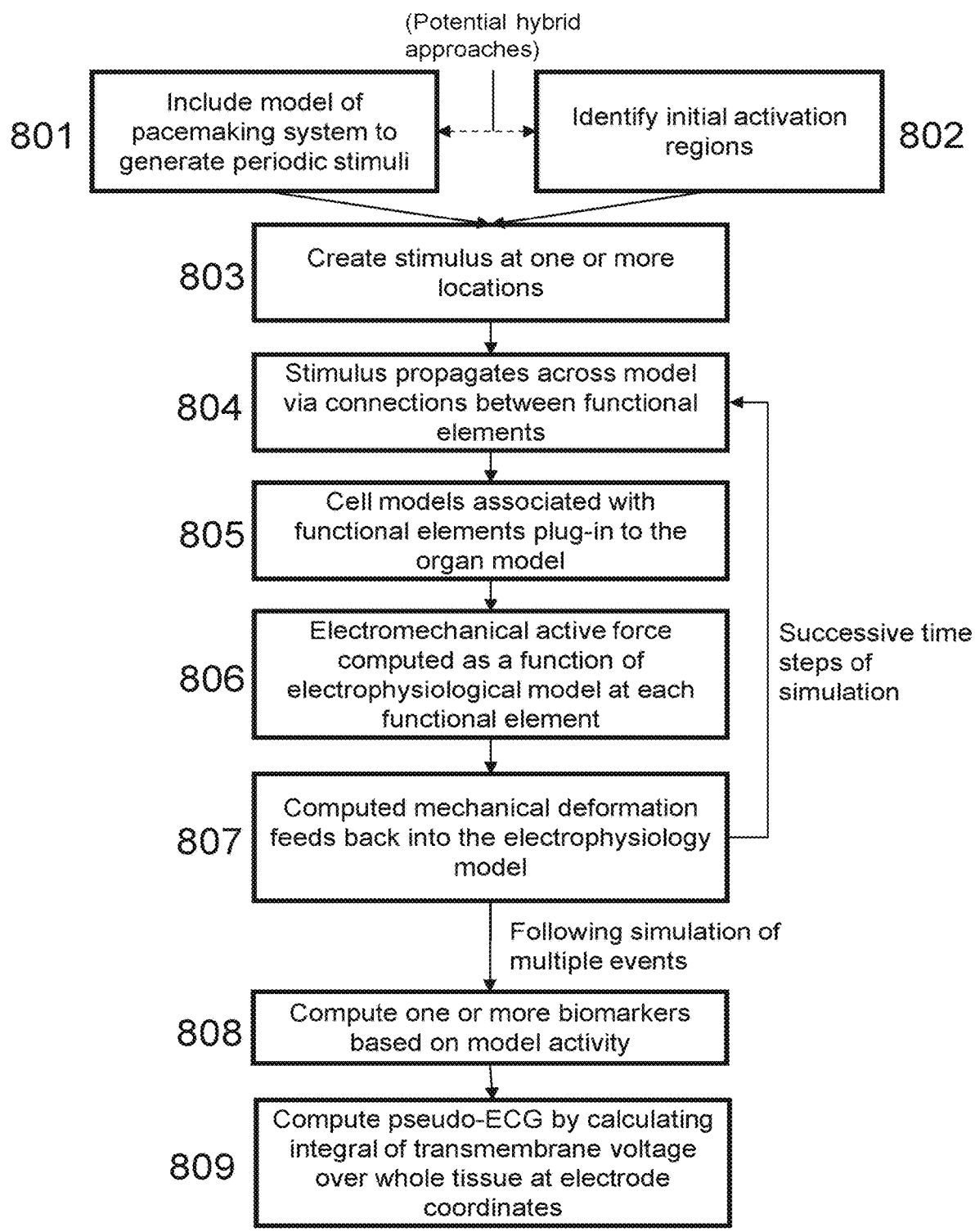
FIG. 8 shows an example representation of the steps involved with running coupled three-dimensional electromechanical and electrophysiological across an organ model produced as described.

Once the three-dimensional model has been generated, simulations of action potentials can be run across the model (80). An example of the steps involved with such simulations for a cardiac model can be seen in FIG. 8, although similar steps apply for models of any muscular tissue. This generally involves the creation of a stimulus at one or more places on the model (803), which unleashes activation at the functional element level that propagates across the mesh. For example, in the heart, activation regions can be selected to represent the cardiac conduction system terminals, called Purkinje-myocardial junctions (PMJs). A one-, two-, or three-dimensional model of part or all of the natural pacemaking system of the heart (describing or modelling the areas of the heart in which stimulus naturally arises, including the sinoatrial and atrioventricular nodes and Purkinje fibres) can be included to drive this initial stimulation (801). Alternatively or additionally, activation can be initiated in areas of the three-dimensional model in regions where early activation is seen (802). Following previous investigations (Durrer D et al "Total excitation of the isolated human heart." *Circulation*. 1970), example initial activation regions can be selected to be one or more of the following: 1-2. two activation areas on the RV wall, near the insertion of the anterior papillary muscle (A-PM) 3. high anterior para-septal LV area below the mitral valve 4. central area on the left surface of the septum 5. posterior LV para-septal area at ⅓ of the apex-base distance; as shown in FIG. 3.

As discussed above, localized initial stimuli activate the functional element, whose action is propagated in space. While the computational functional element is of localized action, modelling the time-dependent electrical activity of an isolated muscular cell (or small group of cells), the three-dimensional organ model is a way of spatially propagating its action throughout a muscle (804), leading to contraction. In the case of the heart, this coordinated and rhythmical contraction causes its pumping action. By contrast, lack of rhythm, coordination, or both, impairs pumping. From the computational viewpoint, the functional element is a localized plug-in to the spatial organ model (805). The feedback arising from a tight coupling between cell and organ models, and the structural definition of the heart anatomy, leads to a realistic computational model of healthy, diseased and treated scenarios.

The next level of coupling in a muscle model happens between electrophysiology and mechanical action. As the action potential propagates, it produces a local tissue contraction mostly (but not exclusively) along the muscular fibres. At the organ level, this represents a mechanical propagation wave which closely follows the action potential propagation wave. Every time step and at each functional element, the electromechanical active force is computed as a function of some quantities computed by the electrophysiology model (806). In turn, and for every time step and at each mesh element, the so computed mechanical deformation feeds back into the electrophysiology model (807).

The mechanical action of muscle is bi-directionally coupled to fluid dynamics through the endocardium. As cardiac tissue moves under the action of electromechanical forces, it deforms the inner cardiac cavities. Such shape change causes the blood within the cavities to move in and out of the heart through valves towards the circulatory system. The mechanical problem is fed back by the blood flow inside the cardiac cavities by the fluid force on the heart inner walls.

To investigate the overall cardiac performance, several biomarkers are computed (808), which can then be compared with those of patients. Many of the biomarkers used in the clinical realm to assess cardiac mechanical activity, can be computed in the computational model:

ECG morphology and QRS duration: Left bundle branch block (LBBB) and a QRS duration >150 ms are strong predictors of LV response to cardiac resynchronisation therapy (CRT). Normal duration of the QRS complex is between 80 and 100 ms. QT interval and QT interval prolongation is the main marker to assess drug proarrhythmic risk Atrio-ventricular (AV) and inter-ventricular (VV) delays: The optimization of AV delay between atrial and ventricular pacing pulses is mandatory for an effective CRT treatment and it is initially performed during the CRT implantation procedure, although posterior corrections can be made according to the clinical evolution of the patient.

Velocity-time integral of the LV outflow tract (LVOT) to estimate cardiac output: In a healthy population, the normal LVOT VTI is 18 to 22 cm for heart rates (HRs) between 55 and 95 beats per minute.

LV end-systolic volume (LVESV): LV reverse remodeling to near normal LVESV values indicates a successful response after CRT (usually assessed after 6 months of the device implantation).

LV Ejection fraction (LVEF): Patients with LVEF>35% are not eligible for CRT (normal range from 55% to 70%). CRT improves LVEF and cardiac remodeling regardless of patient age.

GLS (Global Longitudinal Strain): Since recently, GLS (Global Longitudinal Strain) per AHA segment has been considered as a better marker than EF.

ESVI (End-Systolic Volume Index): Maladaptive ventricular remodeling and depressed cardiac contractility, as determined by increased ESVI (End-Systolic Volume Index, which is ESV divided by body surface area), are predictive of HF hospitalization in a general cohort of outpatients with CHD. ESVI was more effective than more established markers of left-ventricular systolic function (EF) and remodeling (EDVI, End-Diastolic Volume Index) in its ability to predict HF.

Systolic dyssynchrony index (SDI): This was defined as the standard deviation of the time to reach minimum volume for each of the 16 segments of the LV expressed as a percentage of the cardiac cycle. Reverse Remodeling (RR) was defined as a reduction in end-systolic volume (ESV)>=15%.

LV systolic dyssynchrony from 3D echocardiography regional LV time-volume curves: It is the mean standard deviation of time to longitudinal peak displacement in 16 cardiac segments by 3D echo wall motion Speckle Tracking analysis.

Hemodynamic forces: Finally, a new very promising parameter, still under clinical research, but that constitutes a change of paradigm in relation to the parameters able to evaluate LV function is the value of the so-called hemodynamic forces (HDF). HDF have been demonstrated to be a sensitive marker suitable to detect subclinical myocardial failure, unlike LVEF, a parameter with plenty of limitations, and can constitute a very reliable value to assess the improvement of LV function during CRT. HDF are equivalent to the intraventricular pressure gradients.

In a real-life clinical context, these biomarkers can be evaluated from medical images from the patient, in particular echocardiography. These biomarkers are basically used to measure mechanical dyssynchrony among the different regions of the heart, and stroke volume in the ventricles.

The typical biomarker of cardiac electrophysiology is the electrocardiogram (ECG). Electrophysiological activity of a simulated heart, much like in a real-life clinical context, is assessed through a pseudo electrocardiogram (pseudo-ECG) (809). This can be done by locating the three-dimensional heart model within a generated torso and recording the cardiac electrical activity at a plurality of coordinates (or 'electrodes', as they correspond to the electrodes which would be used in recording a real ECG). For example, three electrodes can be positioned at the approximate location of the right arm (RA), left arm (LA) and left leg (LL). The pseudo-ECG can be calculated as an integral over the spatial gradient of the transmembrane voltage within the cardiac tissue. The morphology of the torso generated can be that of a standard torso, or can be personalised to the heart to be simulated, for example by matching it to the group parameters (age, sex, weight, and so on) of the heart, or in the case of a specific individual, to the actual torso morphology.

The calculation of the pseudo-ECGs can be derived from the calculation of the unipolar potentials ($\varphi_e$) as follows:

$$\phi_e(x', y', z') = D \int \left[ -\nabla V_m \cdot \left( \nabla \frac{1}{r} \right) \right] dx + \quad \text{Equation 43}$$

$$D \int \left[ -\nabla V_m \cdot \left( \nabla \frac{1}{r} \right) \right] dy + D \int \left[ -\nabla V_m \cdot \left( \nabla \frac{1}{r} \right) \right] dz$$

$$r = \left[ (x-x')^2 + (y-y')^2 + (z-z')^2 \right]^{\frac{1}{2}}$$

where D is the diffusion tensor at every Gauss point, Vm is the spatial gradient of the transmembrane potential and r is the distance from a source point (x,y,z), which represents a point on the heart geometry, and a field point (x',y',z'), which represents the position of one of the electrodes used to calculate the pseudo-ECG (LA, RA, LL). Electrical potential difference is here defined as the difference in electric potential between two electrodes; these potential differences are represented as "leads". There is always one exploring (positive) and one recording (negative) electrode. In this way, a propagation wave going towards the exploring electrode produces a positive wave and vice versa. The three leads are here defined as $$\text{Lead}_I = \varphi_{LA} - \varphi_{RA}$$

$$\text{Lead}_{II} = \varphi_{LL} - \varphi_{RA}$$

$$\text{Lead}_{III} = \varphi_{LL} - \varphi_{LA} \quad \text{Equation 44}$$

The above methods describe how a three-dimensional model of a heart can be generated, used to simulate cardiac activity, and how useful biomarkers of performance can be derived. Such models and simulations can be personalised to relate more closely to individuals, such as an individual patient, by using information about the heart of that individual, or by using population data which has been adjusted or matched to the individual's characteristics. Conversely, it is possible to generate multiple models to represent multiple real or hypothetical individuals, representing a 'virtual population', by changing the parameters of the models, for example by varying the properties of the ion channels, as described in more detail below.

As previously mentioned, models as described can be used to detect the impact of pathology on the heart, by including correlates to said pathology in the models. For example, morphological defects can be represented in the volume mesh, ion channel abnormalities can be represented in the corresponding cell model equations, and scarring can be represented in the volume mesh and the associated cell models (as described in more detail below). It is also contemplated that models as described herein can be used to predict or otherwise simulate the outcome of medical interventions or treatments, before, during or after such treatments are carried out. For example, treatments which can be simulated include pacemaker installation, drug response, tachycardia induction, and/or ablation, as discussed in more detail below. The impact of these treatments can be reflected in one or more of the volume mesh, the locations of induction of activation, the cell models, and other parameters. The outcomes of these treatments can be determined from observation of one or more of the biomarkers described above. Since the described models allow such predictions to be made on individual-specific information, such approaches are of particular use in determining which treatments can or should be used for an individual, and the likelihood of success.

While such methods are evidently particularly useful when used to model human hearts, it is contemplated that the hearts of animals can be modelled in equivalent ways, and that any embodiment herein can equally apply to nonhumans, such as nonhuman primates or nonhuman mammals.

Virtual Population Generation

Figure 10:
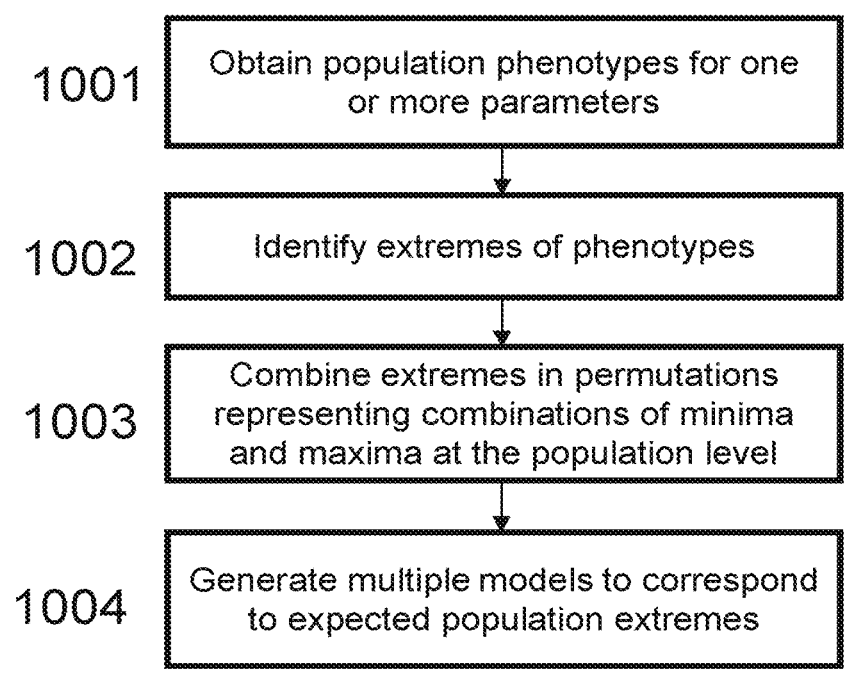
FIG. 10 shows an alternative basic representation of steps involved with producing models as described representing a virtual population.

The generalisable nature of models according to the present disclosure can enable them to represent hearts spanning the heterogeneity demonstrated in a normal population, by varying one or more of the input physiological parameters used to inform the model. For instance, the various transmembrane ion channels which regulate ion flow and membrane potential during an action potential exhibit marked heterogeneity in function and drug response, as determined by in vitro electrophysiological research on those channels, or otherwise. For example, age and sex have been identified as important sources of variation between subjects. An example of the generation of a virtual population based on extremes of variation can be seen in FIG. 10. A spectrum of phenotypes can be identified for each known channel, or other parameter (1001). In this case, a spectrum can be defined by extreme phenotypes (for example, minimum and maximum kinetics for a particular channel), and/or from intermediate values. These values refer to the k factors in Equation 8. Extremes can be taken from a normal population, and/or from a diseased population (1002) (Muszkiewicz et al; "Variability in cardiac electrophysiology: Using experimentally calibrated populations of models to move beyond the single virtual physiological human paradigm" *Progress in Biophysics and Molecular Biology* 2015).

As an illustration, the five ion channels thought to have greatest influence on action potential duration in cardiomyocytes are INa, IKr, IKs, ICaL and INaL. If one requires the analysis of the spectrum of ion channel expressions on a cohort describing the edges of normality, this becomes a combinatorial problem. These five ion channels each give a maximum and a minimum phenotype, meaning that the problem can be reduced to $2^5$ (32) subjects, or 64 if both male and female subjects are used, to represent combinations of minima and maxima for each of these (1003).

Models generated according to the methods described herein can therefore depict hearts according to the extremes which can be reasonably expected in the population (1004), as well as more common intermediate hearts. These approaches can be used to generate virtual populations of phenotypically tractable simulations, which can be specific to gender, age, ion channel genetic mutations, and/or other categories. Once generated, individual virtual patients are effectively independent of each other. As will be indicated further below, other approaches beyond keying on extreme values can be used to generate effective virtual populations, however—other approaches to that shown in FIG. 10 can be employed.

In-Silico Clinical Trial

The ability to create such in silico virtual populations is a particular benefit of the present invention. In contrast to trying to replicate the cardiac behaviour of a single human, this approach allows the user to describe the behaviour of a population, in a manner similar to clinical trials. Similarly, these models can be validated by comparison to responses of a variety of biomarkers measured during clinical trials, or large population studies, rather than by comparing each simulation to a single particular person. Using this approach, simply by employing experimentally based assumptions, the virtual population reproduces a set of markers that exist within the "clinically observed" cardiac behaviour. There does not need to be any "calibration" with those outputs per se—they are predicted. It should be noted that to tailor a specific solution, it may be necessary to calibrate or subsample a population according to any given clinical marker required (i.e. ejection fraction, QT interval, QRS duration). Validation with respect to one or more biomarkers means that the prediction from the models after the knowledge-based assumptions of the parameter variations can describe how a population behaves, and can respond to a particular therapy, in a broadly similar manner to a human clinical trial.

Figure 9:
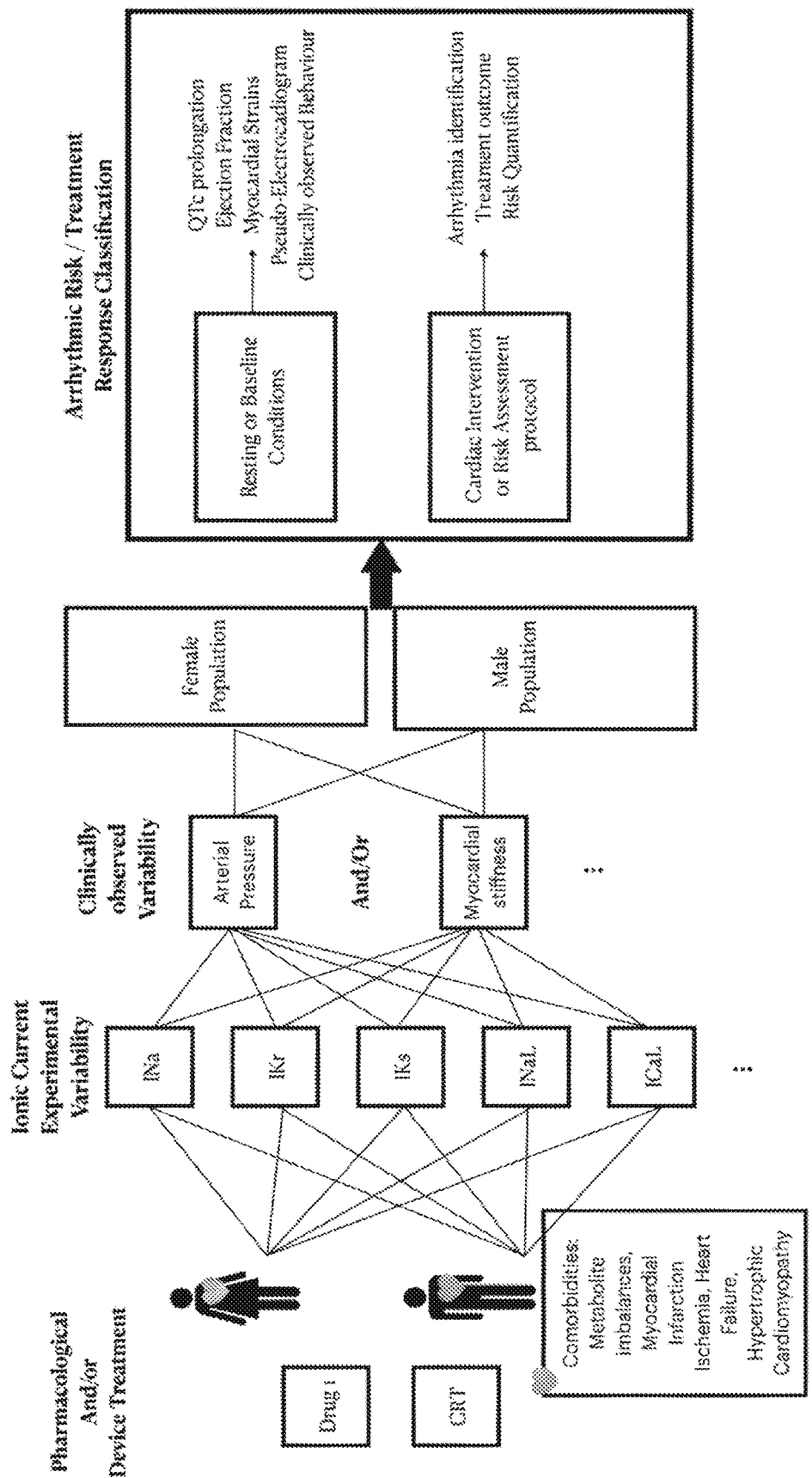
FIG. 9 shows an exemplary process for generating a virtual population of patients according to an embodiment of the invention.

An exemplary in-silico trial methodology is shown in FIG. 9. The approach relies upon an electrophysiology, electro-mechanic or electro-mechanic-fluid model of the human heart as described in this specification, using either male and female anatomies and including male or female cardiomyocyte ion channel expressions. Such a model is capable of reproducing clinically observed features or parameters within human measured behaviour in health or disease: QRS and QT intervals, ejection fraction, systolic and diastolic volumes, flow rates across the cardiac valves, myocardial strains, pressure, longitudinal strains. Accordingly, the user can derive these or other physiological parameters from the models or population.

A further input to the system will be the effect of a medical intervention: this may be a drug (so, drug kinetic activity on the cardiac system may be an input), or the effect of a medical device such as a pacemaker or a pump.

Measured information relating to a pathological state, and/or known variability of input parameters will be a further input. This will be used to ensure that the virtual population, and so the simulation, reflect reality. Such varying parameters may include ion channel conductances or gate kinetics, pressure ranges, tissue property variability like fibrosis, stiffness, conduction velocity, or variability on the crossbridge kinetics.

With these inputs, a virtual population can be generated. An alternative approach to that indicated in FIG. 10 may be used here. A range of permissible variation—typically reflecting real life variation—is established for each of the varying parameters. This may reflect a whole human population, or a sub-population of interest. A mutually consistent subset of the varying parameters is chosen to produce a single virtual patient. Appropriate varying parameters here may be ion channel conductances or gate kinetics in the electrophysiology problem and/or electro-mechanic parameters like pressure or myocardial stiffness. The resulting virtual patient is a valid choice if outputs resulting from these input choices reflect the (relevant) human population—if any of the outputs from the virtual patient fall outside clinically observed physiology for the relevant population, the virtual patient is discarded. If they fall within clinically observed physiology, the patient can be accepted. This process continues until a population of virtual patients of the required size has been created.

There are a variety of possible contexts to which this approach can be applied. In the context of drug administration, one or more drugs can be administered to the population by employing the drug effect on cardiac ion channels (doses, IC50 and h value) and running the models with that drug influence again. Such a situation is considered in greater detail below. In medical device testing, a device intervention can be applied to the virtual population and the results of the intervention (such as cardiac resynchronization therapy) evaluated.

After modelling, it can be determined whether or not all outputs obtained from the virtual patients fall within clinically observed responses. Notably, where a virtual population is generated, the assessment of whether the obtained outputs fall within the space of clinically observed responses can be carried out after the generation of each model/virtual patient within the population, or after the generation of multiple models/virtual patients. If they do not, then the simulation process needs to be re-evaluated—in particular, virtual patients should be excluded from the population as unrepresentative of a real-world population if they are a source of results that do not correlate with real world measurement. This could in principle take place at any stage in the process where a virtual patient does not satisfy a real-world condition—before or after simulation. Once the population is established as representative, it is possible to quantify the effect of the intervention by comparing the result from the intervention to the baseline condition simulations.

Once an intervention has been assessed, it can be subjected to further testing to establish results of value for real world application. Examples include, but are not limited to, the following:

1. Stress testing. This may be used when characterisation of the effect of the intervention is unclear—the virtual population can be subjected to a stress test to identify the cardiac risk of each subject.

2. Programmed Stimulus Protocol. Deep characterisation can also be assessed in more detail particularly for the assessment of arrhythmic risk of Ventricular Tachycardia.
3. Bradycardia. Longer cycle lengths can be employed to assess arrhythmic risk and cardiac function.
4. Pacing Protocol. A variety of pacing protocols may be assessed.
5. Heart rate Effect. Assessment of cardiac function may be made at a variety of heart rates.
6. Pacing Optimization. This may involve optimization of a pacing location, or of a pacing protocol.
7 Ablation. The effects of cardiac ablation locations and strategies may be evaluated.

Assessment of Drug Response at Whole-Organ Level

As indicated above, a particular use for virtual populations of this kind is for the simulation of drug effects on organ function. For example, drug-induced cardiotoxicity is a major concern for the pharmaceutical industry, regulators and clinicians. Determining the potential cardiotoxicity of a drug with cardiotoxic effects on a human population does not have a straightforward answer, and combinations of drugs can have still more unpredictable outcomes. Two of the major problems with determining such effects are the difficulty in extrapolating in vitro effects to whole organ or in vivo outcomes, and the heterogeneity which exists in populations. That is, while methods to determine response to a particular drug by a particular ion channel are fairly well established, it is not easy to determine how a whole heart would react to administration of that drug, let alone how hearts from different individuals could react, which is a necessary consideration when establishing best-and worst-case outcomes for a particular drug.

Figure 11:
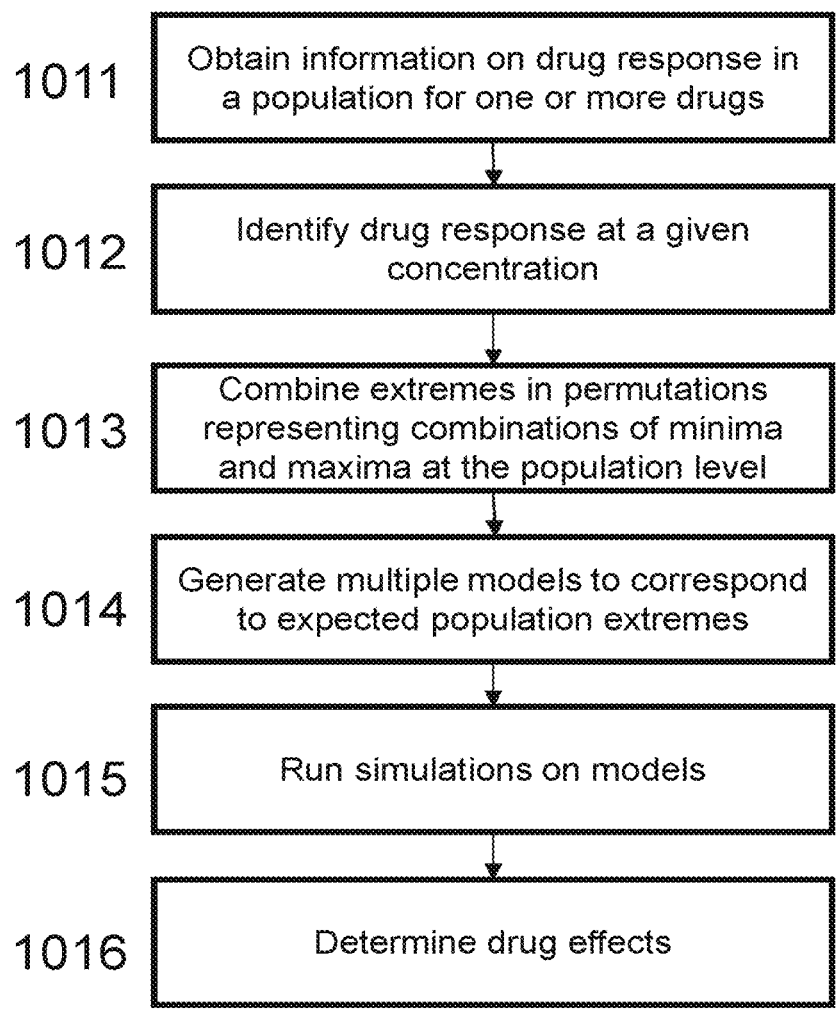
FIG. 11 shows an example basic representation of the steps involved with simulating the effect of one or more drugs on a model produced as described.

FIG. 11 shows one representation of the steps involved with simulating the effect of one or more drugs on a model produced as described. As an example, as discussed above, the five ion channels with most influence on the action potential duration can be selected, and the extremes of the kinetics of these channels identified in male and female cells (1012), to give modelling parameters for these channels in a population of notional subjects. These parameters can be used to generate cell models governing functional elements associated with tissue types (1014), as discussed above, and the effect of one or various particular drugs applied to the conductance of the channels. The effect of particular drugs on specific channels can be determined through reference to existing in vitro electrophysiological data, or can be determined directly (1011). Likewise, the expected concentration of the drug in the plasma of individuals can be obtained from pharmacokinetics and pharmacodynamics models of the particular drug. When it is desired to simulate the effect of more than one drug, the interaction of both drugs can be assumed to be the additive or multiplicative effect of each drug on the ion channels affected, or more complex interactions can be used, again based on empirically determined effects of those drugs on the channels in question.

The drug-affected cell models are run until they reach a steady state (or until their condition is accepted), by simulating action potentials, as described elsewhere herein (1015). The parameters achieved at equilibrium are then used to generate a three-dimensional organ simulation, to represent a whole organ affected by the drug(s) in question. The effect of the drugs on the organ can then be determined (1016). In the heart, this can be assessed, for example, by consideration of a pseudo-ECG and analysis of the characteristic waveforms, by visualising the electrophysiology propagation on the anatomy, or otherwise.

While it is particularly advantageous to use such methods to consider drug effects or other interventions on models taken from virtual populations derived as discussed above, it is also contemplated that such methods can be used to predict the reaction of particular individuals to specific drugs, for example to help in the assignment of treatments to particular patients.

Modelling Arrhythmia

Arrhythmias can follow previous pathology, notably in the case of tachycardia (such as ventricular tachyarrhythmia) following myocardial infarction, which is thought to be linked to the presence of myocardial scarring following the infarction. Since sudden cardiac death is a frequent result of such arrhythmia, it would be valuable to be able to determine, based on an existing pattern of infarct scarring, whether resultant tachycardia is likely for a given patient, so that appropriate action can be taken, such as the use of an implantable cardioverter defibrillator (ICD). Electrophysiological interventions have been developed to predict such problems, such as by using programmed stimulation to apply electrical stimuli directly to the heart tissue in vivo to attempt to induce tachycardia (Josephson M E. "Programmed stimulation for risk stratification for postinfarction sudden cardiac arrest: why and how?" *Pacing Clin Electrophysiol.* 2014; 37 (7): 791-794. doi:10.1111/pace.12412). Despite their predictive ability, such approaches are limited in their obvious invasive nature, the risks of such procedures, and the limited places in the heart tissue that can be effectively stimulated. Thus, models as described herein can enable risk-free versions of these and similar methods to be enacted, without restrictions due to time, surgical practicalities or safety.

The primary aim of programmed simulation is to identify whether tachycardia is likely, and in which area of the cardiac tissue it arises. One potential treatment for such conditions is ablation—inactivation by burning of the tissue volume that habilitates and sustains the ventricular tachycardia. Both the induction of tachycardia and the effects of a potential ablation treatment can be simulated using models as described herein, again without the obvious risks of in vivo approaches, such as ablating a wrongly identified area.

Similar models can also be used to predict the activity of a given heart under standard healthy conditions, or when diseased. Another possibility is the simulation of the effect of particular drugs or other treatments such as pacemaker installation, using approaches described elsewhere herein.

Where induction protocols are attempted on models of post-infarct hearts, using the labelling procedure described above, a tagged region of the volume mesh can be determined, for example based on patient scans, and established within the generated model as representing an infarct scar model (503'). A proximity method can be used to define which cells or nodes of the model are inside the scars. For example, when the scars are defined by closed portions of surface mesh defined by polygons), functional elements inside the polygons are tagged as scar tissue (602). In another possibility, when the scars are defined as clouds of points, functional elements at a certain distance to the points of the clouds are tagged as scar tissue.

For the purposes of the model, the cell models of the functional elements tagged as scar tissue can be represented as lacking one or more of the electrophysiological and/or electromechanical parameters which would otherwise be present in the cell models of the functional elements of that part of the model. For instance, the cell models of the infarcted scar tissue can be represented in the model as having absent or much reduced conductivity, and/or as completely lacking ion channel kinetics. Electromechanical properties can also be absent, reduced, or changed, for example lacking contractility, or having increased stiffness. The same can be applied to an ablated region to assess the outcome of the clinical treatment. The functional elements can be represented as lacking contractility. The tagged region can also be modelled as a 'hole' or 'dense scar', that is, where functional elements are entirely absent (or removed) from that region, to represent complete absence of normal function. Scar tissue can be modelled as homogeneous, such that all cell models of functional elements within the tagged scar region have the same parameters. Scar tissue can also be heterogeneous, where different regions of the scar have different properties. Often, tissue close to the periphery of a scar can be affected less strongly than central scar tissue, and so the properties of cell models of functional elements within tagged scar regions can be assigned or adjusted based on their proximity to functional elements which are not tagged.

Choice of the specific properties, or lack thereof, of cell models governing the functional elements in the region tagged as scar tissue can be determined using experimental data, or via an optimisation process wherein a variety of parameter adjustments are applied in order to most closely approach the in vivo behaviour demonstrated by tissue in question.

Figure 12:
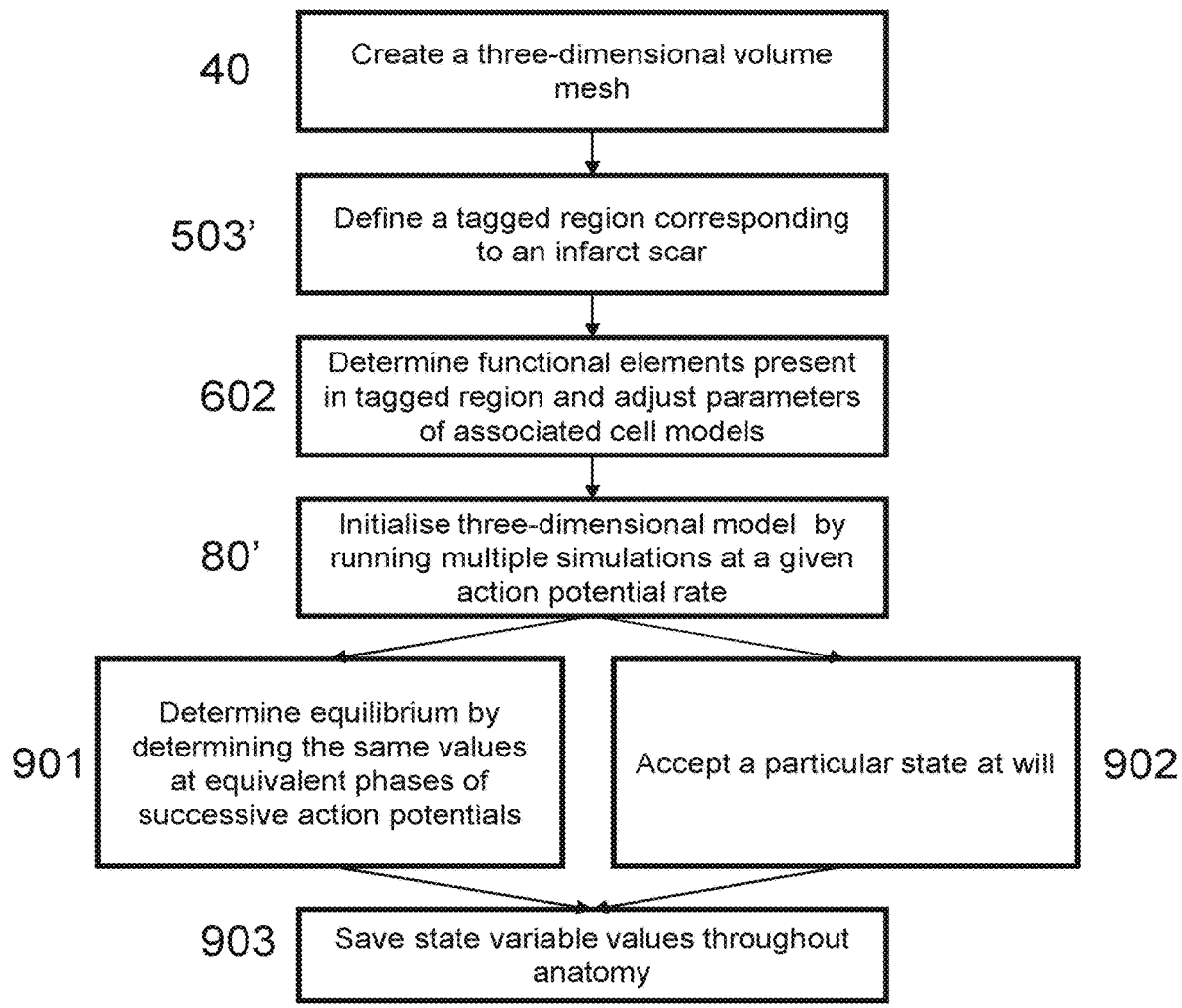
FIG. 12 shows an example representation of the steps involved with defining a tagged region of an infarct scar in a model and simulating multiple activations across a heart model produced as described.

To initialise a model for investigating the induction of tachycardia, coupled three-dimensional electromechanical and/or electrophysiological simulations can be run across the volume mesh, at a given action potential rate, for a number of 'heartbeats' (80'), until a steady state is reached, an example of which is shown in FIG. 12. Similar to the establishment of a steady state at the cell model and other levels, for an organ-level simulation, a steady state must also be reached which represents the equilibrium cardiac activity for a given subject at a given beat rate (901). Again similarly, a state can be accepted even if equilibrium is not reached (902), if desired. The steady state at organ level can be achieved where one or more of the electrophysiological or electromechanical values of the organ simulation return to the same value at the same phase of each action potential. This can be determined, for example, by the root mean squared error of such values falling below a particular threshold. Examples of values which can be used for this determination, for an organ-level simulation particularly, include a certain aspect of the morphology of the pseudo-ECG and/or the volumetric integral of the calcium transient throughout the entire modelled anatomy, or the cavity pressure-volume relationship. Once a steady state is achieved or accepted, all the state variable values throughout the anatomy (that is, the necessary values that completely and uniquely define a state of the system) are saved (903), such that the simulation can be started and re-started from an identical time point.

Figure 13:
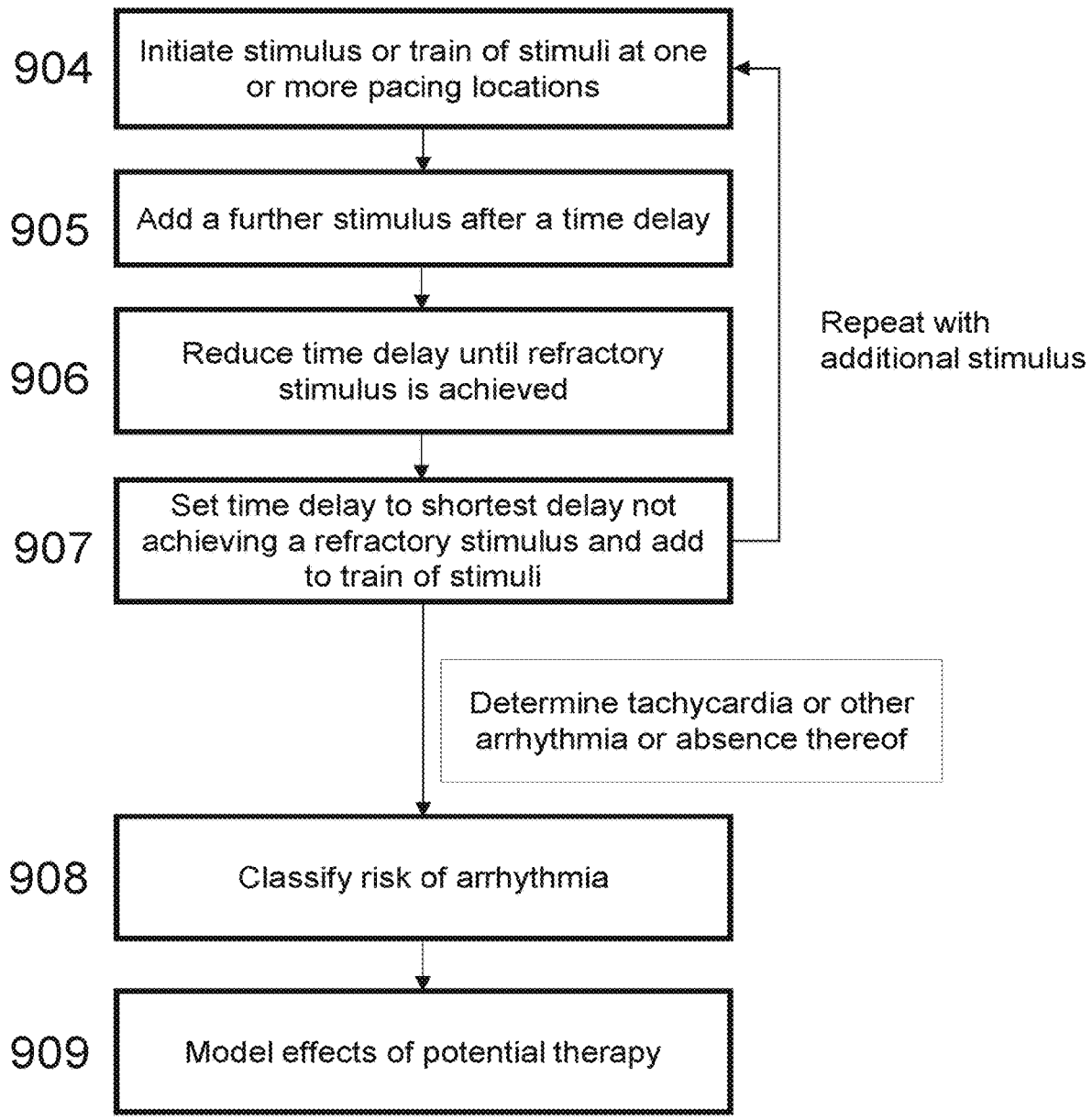
FIG. 13 shows an example representation of the steps involved with inducing a tachycardia or other arrhythmia in a heart model produced as described.

Once these initial variable values are established, an induction protocol for tachycardia can be carried out, an example of which process is shown in FIG. 13. This process may involve defining at least one portion of the volume mesh as a pacing location, as discussed above. Pacing locations may be implicated by clinical guidelines, and generally include the apex of the right ventricle, apex of the left ventricle, and/or the right ventricular outflow tract (Josephson M E. "Programmed stimulation for risk stratification for postinfarction sudden cardiac arrest: why and how?" *Pacing Clin Electrophysiol.* 2014; 37 (7): 791-794. doi:10.1111/pace.12412). The process may then involve initiating activation in at least one of the selected pacing locations (904) (an S1 stimulus), and adding a second stimulus in the same location (an S2 stimulus) after a time delay (905). This process is repeated, shortening the time delay to the second stimulus each time (for example, by 10 ms each time), and determining if a refractory stimulus is achieved (906). In this context, achieving a refractory stimulus means that a stimulus no longer generates a propagation (as the tissue is in a refractory period). Propagation absence/presence can be rapidly determined by observing the biomarkers discussed above (typically the pseudo-ECG).

Subsequently, activation is initiated (without resetting) as a train of two stimuli, the initial stimulus (S1), followed by a second stimulus (S2), with a time delay between S1 and S2 equal to the shortest time delay that triggered propagation (that is, the last time delay tested before reaching the refractory stimulus), or a time delay which is set slightly longer (for example, 10 ms longer) than the time delay which led to a refractory stimulus (907).

The preceding activation steps may then be repeated, with increased numbers of stimuli (i.e. S3, S4, and so on) until a tachycardia or other arrhythmia is observed. In some embodiments, four such extra stimuli can be administered in order to class tachycardia as present or absent as in similar in vivo procedures (Josephson, 2014). A benefit of the present models is that more stimuli can be used without impact on time or safety, so in some embodiments, five, six, seven or more stimuli can be used. For example, a sustained ventricular tachycardia can be characterised by three or more reentrant full heart activations during the S1-S2 . . . pacing protocol. Such outcomes can be identified for example by a characteristic change in the pseudo-ECG described elsewhere, or by visualising the electrophysiology propagation on the anatomy. This protocol can be repeated at different pacing locations or different combinations thereof.

The outcome of these methods can be used to classify a particular subject as at risk, or not at risk of tachycardia or other arrhythmia (908). As mentioned above, such information can feed into similar simulations regarding potential treatment or mitigation for the tachycardia, such as ablation therapy or medication (909).

The invention claimed is:
1. A computer-implemented method of simulating a heart, the method comprising:
    establishing a heart model with an electromechanical aspect and an electrophysiological aspect, where the heart model comprises a three-dimensional model of a heart comprising a plurality of functional elements, by:
        defining a plurality of tissue types to be included within the heart model;
        for each tissue type, defining an associated cell model for a functional element to be associated with that tissue type, wherein each cell model comprises:
            a system of ordinary differential equations describing electrophysiological and electromechanical properties for that tissue type, the system at least describing cell kinetics for ion channels of that tissue type;
    for each cell model, simulating multiple activation events, until a steady state is reached or accepted;
    constructing a three-dimensional model of a heart, by:
        creating a volume mesh comprising tissue type regions corresponding to each of the plurality of tissue types, wherein each tissue type region is populated by a plurality of functional elements with their associated cell model;

determining one or more heterogeneous regions, wherein the one or more heterogeneous regions have electrophysiological and/or electromechanical properties varied from normal properties for their tissue type;

defining a local muscular fibre orientation in each tissue type region to correspond to a local alignment of muscular cells; and running coupled three-dimensional electromechanical and electrophysiological simulations across the volume mesh;

establishing one or more tagged regions to represent an infarct scar model;

defining at least one portion of the volume mesh as a pacing location;

establishing a 3D stationary state for simulations by running coupled three-dimensional electromechanical and/or electrophysiological simulations across the volume mesh until a steady state is reached;

once a steady state is reached, saving the state variable values for the cell models of the functional elements comprised within the three-dimensional model; and carrying out a tachycardia induction protocol comprising:
  returning the three-dimensional model to the state variable values as saved;
  initiating a first stimulus (S1) in at least one pacing location;
  adding a second stimulus (S2) in the same or different pacing location after a delay;
  repeating the stimuli (S1, S2 . . . ) with progressively reduced delay until a refractory stimulus is achieved;
  initiating activation with a train of stimuli (S1, S2 . . . ), with a delay equal to the shortest delay which did not achieve a refractory stimulus;
  repeating the preceding activation steps, further comprising adding an additional stimulus (S3, S4 . . . ) in the same or different pacing location with a further delay; and
  determining whether tachycardia is observed.

2. The method of claim 1, wherein the cell model comprises:
  i) electrophysiological parameters relating to one or more of ion channel dynamics, transmembrane voltage, and a calcium transient; and/or
  ii) electromechanical parameters selected from one or more of stiffness, stress, strain, elasticity, and contractility.

3. The method of claim 1, wherein the heart model relates to the heart of an individual, preferably wherein the volume mesh is based on the individual's identified heart morphology.

4. The method of claim 1, wherein the one or more heterogenous regions comprise one or more tagged regions populated by functional elements with associated cell models which are assigned different electrophysiological and/or electromechanical parameters compared to regions which are not tagged, preferably wherein the tagged region corresponds to tissue affected by one or more of fibrosis, infarction, hypertrophy and ischemia.

5. The method of claim 1, wherein the simulations are used to model the effects of one or more treatments on the heart.

6. A computer-implemented method of simulating a heart for a virtual patient, the method comprising:
  establishing a heart model with an electromechanical aspect and an electrophysiological aspect, where the heart model comprises a three-dimensional model of a heart comprising a plurality of functional elements, by:
    defining a plurality of tissue types to be included within the heart model;
    for each tissue type, defining an associated cell model for a functional element to be associated with that tissue type, wherein each cell model comprises:
      a system of ordinary differential equations describing electrophysiological and electromechanical properties for that tissue type, the system at least describing cell kinetics for ion channels of that tissue type;
    determining a plurality of input physiological parameters for the virtual patient, wherein each of the physiological parameters lies within an observed range in a human population;
    determining a plurality of input physiological parameters for at least one further virtual patient, in order to create a virtual population of multiple virtual patients, wherein at least one of the input physiological parameters differs for each virtual patient within the population,
      wherein the input physiological parameters for each virtual patient comprise electrophysiological and mechanical parameters of the cell models comprising models of transmembrane ion channels, and wherein defining the models of transmembrane ion channels comprises establishing a variety of parameter values that determine a spectrum of phenotypes in the human population for each of the ion channels, such that a test virtual population for simulation is generated from combinations of values from said spectrum of phenotypes;
    constructing a three-dimensional model of a heart for the virtual patient, by:
      creating a volume mesh comprising tissue type regions corresponding to each of the plurality of tissue types, wherein each tissue type region is populated by a plurality of functional elements with their associated cell model;
      defining a local muscular fibre orientation in each tissue type region to correspond to a local alignment of muscular cells;
    and
    running coupled three-dimensional electromechanical and electrophysiological simulations across the volume mesh, and
    determining one or more derived physiological parameters for the virtual patient, and for a subset of the derived physiological parameters determining that said derived physiological parameters lie within an observed range in a human population.

7. A computer-implemented method of simulating a heart for a virtual patient, the method comprising:
  establishing a heart model with an electromechanical aspect and an electrophysiological aspect, where the heart model comprises a three-dimensional model of a heart comprising a plurality of functional elements, by:
    defining a plurality of tissue types to be included within the heart model;
    for each tissue type, defining an associated cell model for a functional element to be associated with that tissue type, wherein each cell model comprises:
      a system of ordinary differential equations describing electrophysiological and electromechanical properties for that tissue type, the system at least describing cell kinetics for ion channels of that tissue type;

determining a plurality of input physiological parameters for the virtual patient, wherein each of the physiological parameters lies within an observed range in a human population;

determining a plurality of input physiological parameters for at least one further virtual patient, in order to create a virtual population of multiple virtual patients, wherein at least one of the input physiological parameters differs for each virtual patient within the population, wherein the input physiological parameters for each virtual patient comprise electrophysiological parameters of the cell models comprising models of transmembrane ion channels, and wherein defining the models of transmembrane ion channels comprises establishing a variety of parameter values that determine a spectrum of phenotypes in the human population for each of the ion channels, such that a test virtual population for simulation is generated from combinations of values from said spectrum of phenotypes;

constructing a three-dimensional model of a heart for the virtual patient, by:

creating a volume mesh comprising tissue type regions corresponding to each of the plurality of tissue types, wherein each tissue type region is populated by a plurality of functional elements with their associated cell model;

defining a local muscular fibre orientation in each tissue type region to correspond to a local alignment of muscular cells; and running coupled three-dimensional electromechanical and electrophysiological simulations across the volume mesh, and determining one or more derived physiological parameters for the virtual patient, and for a subset of the derived physiological parameters determining that said derived physiological parameters lie within an observed range in a human population.

8. The method of claim 7, wherein the input physiological parameters comprise electrophysiological parameters relating to one or more of ion channel dynamics, gate kinetics, transmembrane voltage, and a calcium transient; and/or wherein the input physiological parameters for each virtual patient comprise electromechanical parameters selected from one or more of stiffness, stress, strain, elasticity, and contractility.

9. The method of claim 7, wherein the different input physiological parameters comprise one or more of ion channel conductances or gate kinetics, pressure ranges, tissue properties, stiffness, conduction velocity, or variability on the crossbridge kinetics.

10. The method of claim 7, wherein the different input physiological parameters comprise the effect of a medical intervention, optionally wherein the effect of a medical intervention is selected from drug kinetic activity, and the effect of a medical device.

11. The method of claim 10, wherein the medical device is a pacemaker.

12. The method of claim 10, wherein the medical device is a pump.

13. The method of claim 7, wherein the different input physiological parameters comprise information relating to a pathological state, and/or known variability of input parameters.

14. The method of claim 7, wherein for each cell model, multiple activation events are simulated, until a steady state is reached or accepted.

15. The method of claim 7, further comprising determining one or more heterogeneous regions in the three-dimensional model of a heart, wherein the one or more heterogeneous regions have electrophysiological and/or electromechanical properties varied from normal properties for their tissue type, and wherein the tagged region corresponds to tissue affected by one or more of fibrosis, infarction, hypertrophy and ischemia.

16. The method of claim 7, wherein running coupled three-dimensional electromechanical and electrophysiological simulations across the volume mesh comprises using an instance of simulation code for each of the electromechanical and electrophysiological simulations coupled through one or more message passing interfaces.

17. The method of claim 7, wherein the one or more derived physiological parameters comprise one or more of QRS and QT intervals, ejection fraction, systolic and diastolic volumes, flow rates across the cardiac valves, myocardial strains, pressure, and longitudinal strains.

18. The method of claim 7, further comprising establishing cardiotoxicity of one or more drugs by determining the effects of said drugs on the ion channels and derived physiological parameters across the test virtual population.

19. The method of claim 7, wherein the simulations are used to model the effects of one or more treatments on the heart.

* * * * *